US012793878B2

(12) United States Patent
Shiga et al.

(10) Patent No.: US 12,793,878 B2
(45) Date of Patent: Nov. 10, 2026

(54) MULTILAYER COIL COMPONENT

(71) Applicant: TDK CORPORATION, Tokyo (JP)

(72) Inventors: Yuto Shiga, Tokyo (JP); Kazuya Tobita, Tokyo (JP); Youichi Kazuta, Tokyo (JP); Yuichi Takubo, Tokyo (JP); Toshinori Matsuura, Tokyo (JP); Junichiro Urabe, Tokyo (JP); Noriaki Hamachi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 959 days.

(21) Appl. No.: 17/959,103

(22) Filed: Oct. 3, 2022

(65) Prior Publication Data

US 2023/0107587 A1 Apr. 6, 2023

(30) Foreign Application Priority Data

Oct. 5, 2021 (JP) ................................ 2021-164034

(51) Int. Cl.
*H01F 17/00* (2006.01)
*H01F 17/02* (2006.01)
*H01F 27/29* (2006.01)

(52) U.S. Cl.
CPC ......... *H01F 17/0013* (2013.01); *H01F 17/02* (2013.01); *H01F 27/292* (2013.01); *H01F 2017/0073* (2013.01)

(58) Field of Classification Search
CPC .... H01F 17/0013; H01F 17/02; H01F 27/292; H01F 2017/0073; H01F 5/04
USPC ................................ 336/200, 232, 192, 198
See application file for complete search history.

(56) References Cited

U.S. PATENT DOCUMENTS

| | | | | |
|---|---|---|---|---|
| 2013/0187744 | A1 | 7/2013 | Seko et al. | |
| 2019/0066912 | A1 | 2/2019 | Takeda et al. | |
| 2019/0122808 | A1* | 4/2019 | Jo | H01F 17/0013 |
| 2019/0156977 | A1* | 5/2019 | Jung | H01F 27/292 |
| 2019/0333689 | A1* | 10/2019 | Park | H01F 27/32 |
| 2019/0355508 | A1* | 11/2019 | Lim | H01F 17/0013 |
| 2019/0362884 | A1* | 11/2019 | Kwon | H01F 27/292 |

(Continued)

FOREIGN PATENT DOCUMENTS

| | | |
|---|---|---|
| JP | 2013-038392 A | 2/2013 |
| JP | 2013-153009 A | 8/2013 |

(Continued)

OTHER PUBLICATIONS

English Translation of Aug. 18, 2026 Office Action issued in Japanese Application No. 2026-008698.

*Primary Examiner* — Shawki S Ismail
*Assistant Examiner* — Kazi S Hossain
(74) *Attorney, Agent, or Firm* — Oliff PLC

(57) ABSTRACT

A multilayer coil component includes an element body, a coil, and an external electrode. The element body includes a main surface, side surfaces opposing each other in a first direction, and end surfaces opposing each other in a second direction. The external electrode is electrically connected to the coil. The coil includes a plurality of coil conductors disposed in the first direction. The external electrode includes a plurality of electrode conductors disposed in the first direction. The plurality of coil conductors include coil conductors positioned in the same layer as the plurality of electrode conductors and coil conductors not positioned in the same layer as any of the plurality of electrode conductors.

16 Claims, 11 Drawing Sheets

(56) References Cited

U.S. PATENT DOCUMENTS

| | | | | |
|---|---|---|---|---|
| 2020/0013537 | A1* | 1/2020 | Song .................. | H01F 27/2804 |
| 2020/0357557 | A1* | 11/2020 | Shiga .................. | H01F 17/0013 |
| 2020/0402701 | A1 | 12/2020 | Shiga et al. | |
| 2021/0027934 | A1* | 1/2021 | Mizukami ........... | H01F 27/2804 |

FOREIGN PATENT DOCUMENTS

| | | | |
|---|---|---|---|
| JP | 2019-046936 | A | 3/2019 |
| JP | 2019-133992 | A | 8/2019 |
| JP | 2021-002591 | A | 1/2021 |

* cited by examiner

MULTILAYER COIL COMPONENT

BACKGROUND OF THE INVENTION

1. Field of the Invention

The present invention relates to a multilayer coil component.

2. Description of Related Art

Known multilayer coil components include an element body, a coil having a plurality of interconnected coil conductors, and a pair of external electrodes each having a plurality of interconnected electrode conductors (see, for example, Japanese Unexamined Patent Publication No. 2013-153009).

SUMMARY OF THE INVENTION

In the multilayer coil component described in Japanese Unexamined Patent Publication No. 2013-153009, the external electrode may peel off the element body in a case where, for example, the environmental temperature changes. The peeling of the external electrode is attributable to the difference in coefficient of thermal expansion or thermal contraction between the element body and the external electrode. The peeling of the external electrode off the element body may deteriorate the characteristics of the multilayer coil component. The characteristics of the multilayer coil component include electrical and magnetic properties.

An object of each aspect of the present invention is to provide a multilayer coil component that suppresses characteristic deterioration.

A multilayer coil component according to a first aspect of the present invention includes an element body, a coil, and an external electrode. The element body includes a main surface configuring a mounting surface, a first side surface and a second side surface opposing each other in a first direction, and a pair of end surfaces opposing each other in a second direction. The coil is disposed in the element body. The external electrode is electrically connected to the coil and disposed in the element body. The coil includes a plurality of coil conductors disposed in the first direction and interconnected. The external electrode includes a plurality of electrode conductors disposed in the first direction and interconnected. The plurality of coil conductors include a plurality of first coil conductors, a second coil conductor, and a third coil conductor. The plurality of first coil conductors are positioned in the same layer as the plurality of electrode conductors. The second coil conductor is not positioned in the same layer as any of the plurality of electrode conductors and is electrically connected to a first outermost electrode conductor positioned closest to the first side surface among the plurality of electrode conductors. The third coil conductor is not positioned in the same layer as any of the plurality of electrode conductors and is electrically connected to a second outermost electrode conductor positioned closest to the second side surface among the plurality of electrode conductors.

In the first aspect, the plurality of electrode conductors are positioned in the same layer as the plurality of first coil conductors and are not positioned in the same layer as the second coil conductor and the third coil conductor. In the first aspect, the volume of the external electrode with respect to the element body in the first direction is smaller than in a configuration in which a plurality of electrode conductors are also positioned in the same layer as the second coil conductor and the third coil conductor. In the first aspect, the external electrode tends not to peel off the element body even in the case of a difference in coefficient of thermal expansion or thermal contraction between the element body and the external electrode. As a result, deterioration of the characteristics of the multilayer coil component is suppressed.

In the first aspect, the external electrode may include a first external electrode including the first outermost electrode conductor and a second external electrode including the second outermost electrode conductor. Each of the first outermost electrode conductor and the second outermost electrode conductor may include a first conductor part and a second conductor part. The first conductor part may be exposed at least on the main surface. The second conductor part may be continuous with the first conductor part and protrude into the element body when viewed from the first direction. The second coil conductor may overlap the second conductor part of the first outermost electrode conductor when viewed from the first direction and may be electrically connected to the second conductor part of the first outermost electrode conductor. The third coil conductor may overlap the second conductor part of the second outermost electrode conductor when viewed from the first direction and may be electrically connected to the second conductor part of the second outermost electrode conductor.

The coil is reliably connected to the external electrode in the configuration in which each of the first outermost electrode conductor and the second outermost electrode conductor includes the second conductor part described above and each of the second coil conductor and the third coil conductor overlaps the second conductor part when viewed from the first direction.

In the first aspect, each of the second coil conductor and the third coil conductor may include a third conductor part and a fourth conductor part. The third conductor part may configure a part of an annular track in the coil. The fourth conductor part may be continuous with the third conductor part and protrude outside the annular track when viewed from the first direction. The fourth conductor part of the second coil conductor may overlap the second conductor part of the first outermost electrode conductor when viewed from the first direction and may be electrically connected to the second conductor part of the first outermost electrode conductor. The fourth conductor part of the third coil conductor may overlap the second conductor part of the second outermost electrode conductor when viewed from the first direction and may be electrically connected to the second conductor part of the second outermost electrode conductor.

The coil is reliably connected to the external electrode in the configuration in which each of the second coil conductor and the third coil conductor includes the fourth conductor part described above and the fourth conductor part of each of the second coil conductor and the third coil conductor overlaps the second conductor part of each of the first outermost electrode conductor and the second outermost electrode conductor when viewed from the first direction.

In the first aspect, the second conductor part of the first outermost electrode conductor and the fourth conductor part of the second coil conductor may be connected to each other in the first direction. The second conductor part of the second outermost electrode conductor and the fourth conductor part of the third coil conductor may be connected to each other in the first direction.

In the configuration in which the second conductor part of the first outermost electrode conductor and the fourth conductor part of the second coil conductor are connected in the first direction and the second conductor part of the second outermost electrode conductor and the fourth conductor part of the third coil conductor are connected in the first direction, the second conductor part and the fourth conductor part positioned in different layers are appropriately connected, and the electrical connection between the coil and the external electrode is more reliably maintained. As a result, deterioration of the characteristics of the multilayer coil component is suppressed.

In the first aspect, the external electrode may include a first external electrode including the first outermost electrode conductor and a second external electrode including the second outermost electrode conductor. The first coil conductor positioned in the same layer as the first outermost electrode conductor may overlap the second coil conductor when viewed from the first direction and may be continuous with the first outermost electrode conductor. The first coil conductor positioned in the same layer as the second outermost electrode conductor may overlap the third coil conductor when viewed from the first direction and may be continuous with the second outermost electrode conductor.

In a case where the first coil conductor positioned in the same layer as the first outermost electrode conductor is continuous with the first outermost electrode conductor, the continuous part between the first coil conductor positioned in the same layer as the first outermost electrode conductor and the first outermost electrode conductor is capable of overlapping the second coil conductor in the first direction. In a case where the first coil conductor positioned in the same layer as the second outermost electrode conductor is continuous with the second outermost electrode conductor, the continuous part between the first coil conductor positioned in the same layer as the second outermost electrode conductor and the second outermost electrode conductor is capable of overlapping the third coil conductor in the first direction. The direct current resistance of the coil decreases in the configuration in which the continuous part between the first coil conductor and the first outermost electrode conductor overlaps the second coil conductor in the first direction and the continuous part between the first coil conductor and the second outermost electrode conductor overlaps the third coil conductor in the first direction. Consequently, the characteristics of the multilayer coil component are improved.

A multilayer coil component according to a second aspect of the present invention includes an element body, a coil, and an external electrode. The element body includes a main surface configuring a mounting surface, a pair of side surfaces opposing each other in a first direction, and a pair of end surfaces opposing each other in a second direction. The coil is disposed in the element body such that a coil axis direction is along the first direction. The external electrode is electrically connected to the coil and disposed in the element body. A length of the external electrode in the first direction is smaller than a length of the coil in the first direction.

In the second aspect, the length of the external electrode in the first direction is smaller than the length of the coil in the first direction. In the second aspect, the volume of the external electrode with respect to the element body in the first direction is smaller than in a configuration in which the length of the external electrode in the first direction is equal to or greater than the length of the coil in the first direction. In the second aspect, the external electrode tends not to peel off the element body even in the case of a difference in coefficient of thermal expansion or thermal contraction between the element body and the external electrode. As a result, deterioration of the characteristics of the multilayer coil component is suppressed.

A multilayer coil component according to a third aspect of the present invention includes an element body, a coil, and an external electrode. The element body includes a main surface configuring a mounting surface, a pair of side surfaces opposing each other in a first direction, and a pair of end surfaces opposing each other in a second direction. The coil is disposed in the element body such that a coil axis direction is along the first direction. The external electrode is electrically connected to the coil and disposed in the element body. Both ends of the coil in the first direction are exposed from the external electrode in the first direction when the external electrode and the coil are viewed from a direction orthogonal to the first direction.

In the third aspect, when the external electrode and the coil are viewed from the direction orthogonal to the first direction, both ends of the coil in the first direction are exposed from the external electrode in the first direction. The length of the external electrode in the first direction is smaller than the length of the coil in the first direction. In the third aspect, the volume of the external electrode with respect to the element body in the first direction is smaller than in a configuration in which both ends of the coil in the first direction are not exposed from the external electrode in the first direction. In the third aspect, the external electrode tends not to peel off the element body even in the case of a difference in coefficient of thermal expansion or thermal contraction between the element body and the external electrode. As a result, deterioration of the characteristics of the multilayer coil component is suppressed.

In each of the above aspects, the external electrode may be exposed only on the corresponding end surface of the pair of end surfaces and the main surface.

In the configuration in which the external electrode is exposed only on the corresponding end surface of the pair of end surfaces and the main surface, when the multilayer coil component is mounted on an electronic device, a sufficient region of contact with the electronic device is ensured in the exposed surface of the external electrode.

In each of the above aspects, the external electrode may be exposed only on the main surface.

In the configuration in which the external electrode is exposed only on the main surface, the volume of the external electrode with respect to the element body is small. Accordingly, the external electrode tends not to peel off the element body even in the case of a difference in coefficient of thermal expansion or thermal contraction between the element body and the external electrode. As a result, deterioration of the characteristics of the multilayer coil component is further suppressed.

A multilayer coil component according to a fourth aspect of the present invention includes an element body, a coil, and an external electrode. The coil is disposed in the element body. The external electrode is electrically connected to the coil and disposed in the element body. The coil includes a plurality of coil conductors disposed in a coil axis direction of the coil and interconnected. The plurality of coil conductors include a pair of outermost coil conductors positioned outermost in the coil axis direction. The external electrode includes a plurality of electrode conductors disposed in the coil axis direction and interconnected. The plurality of electrode conductors include a pair of outermost electrode conductors positioned outermost in the coil axis direction. Each of the pair of outermost electrode conductors is not positioned in the same layer as the pair of outermost coil conductors and is electrically connected to the coil.

In the fourth aspect, the coil includes the plurality of coil conductors disposed in the coil axis direction, and the external electrode includes the plurality of electrode conductors disposed in the coil axis direction. Each of the pair of outermost electrode conductors is not positioned in the same layer as the pair of outermost coil conductors. In the fourth aspect, the volume of the external electrode with respect to the element body in the first direction is smaller than in a configuration in which each of the pair of outermost electrode conductors is positioned in the same layer as the pair of outermost coil conductors. In the fourth aspect, the external electrode tends not to peel off the element body even in the case of a difference in coefficient of thermal expansion or thermal contraction between the element body and the external electrode. As a result, deterioration of the characteristics of the multilayer coil component is suppressed.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

DETAILED DESCRIPTION OF EMBODIMENTS

Figure 1:
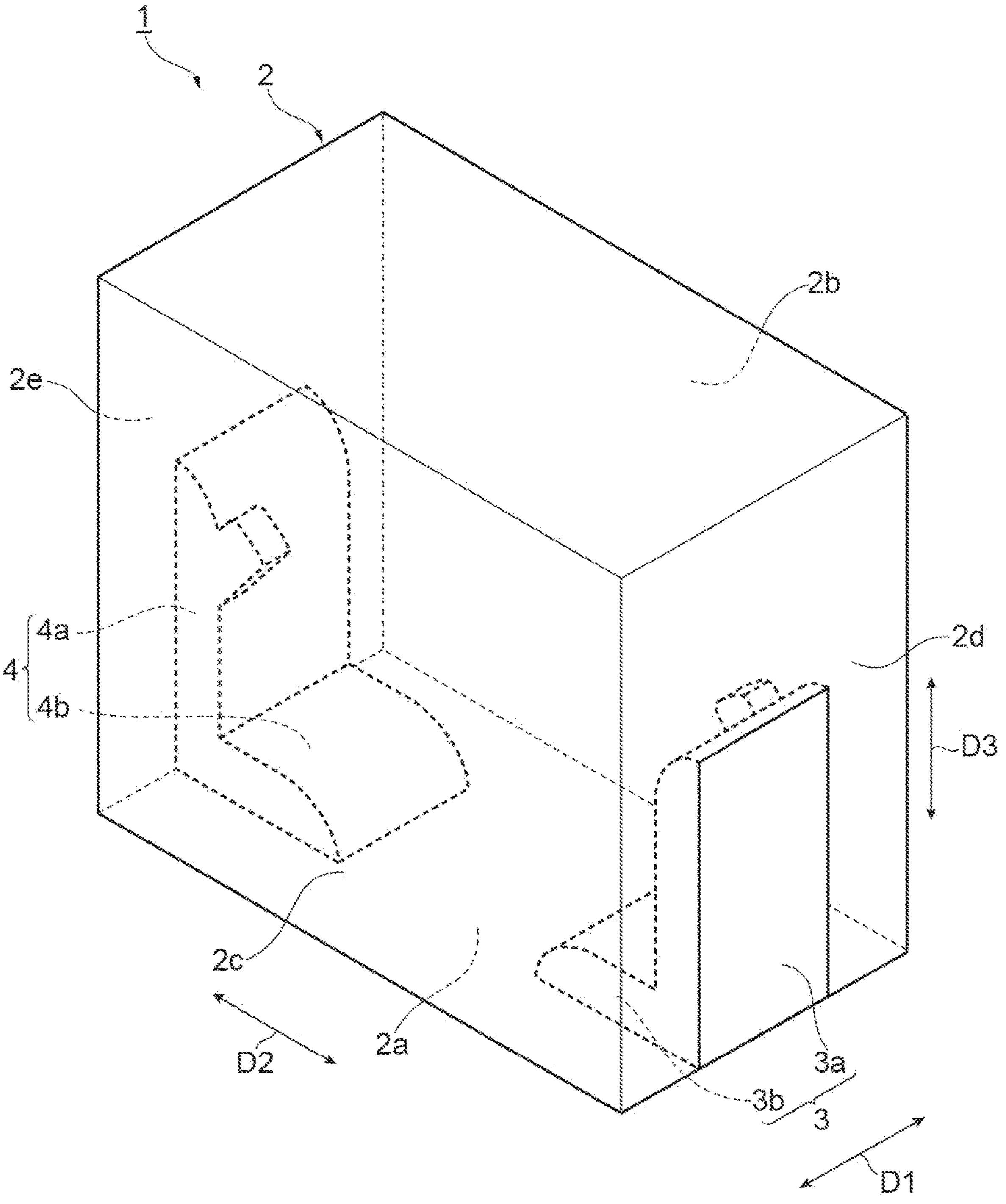
FIG. 1 is a perspective view illustrating a multilayer coil component according to a first embodiment.

Hereinafter, embodiments of the present invention will be described in detail with reference to the accompanying drawings. In the following description, the same elements or elements having the same functions are denoted with the same reference numerals and overlapped explanation is omitted.

First Embodiment

Figure 2:
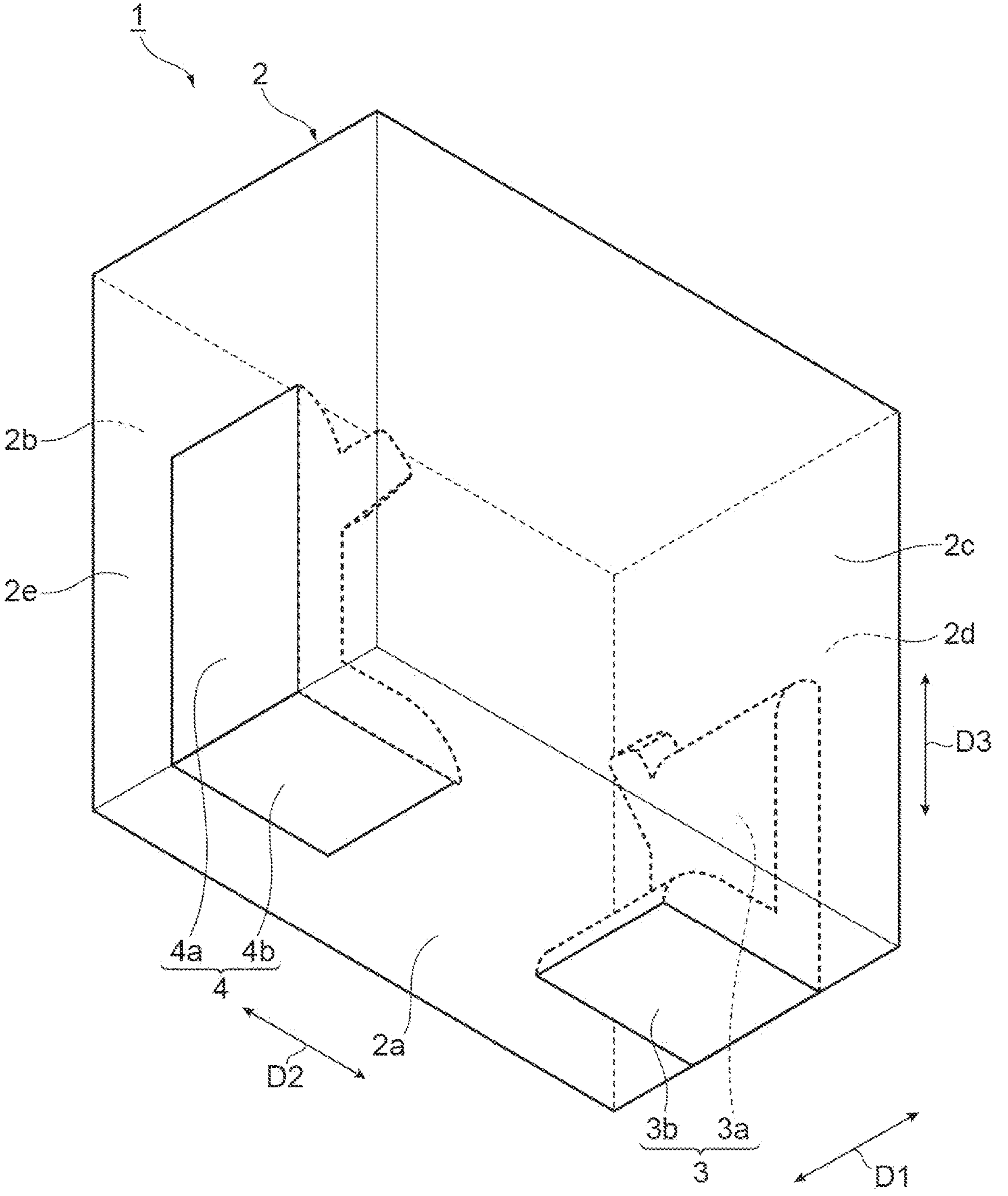
FIG. 2 is a perspective view illustrating the multilayer coil component according to the first embodiment.
Figure 3:
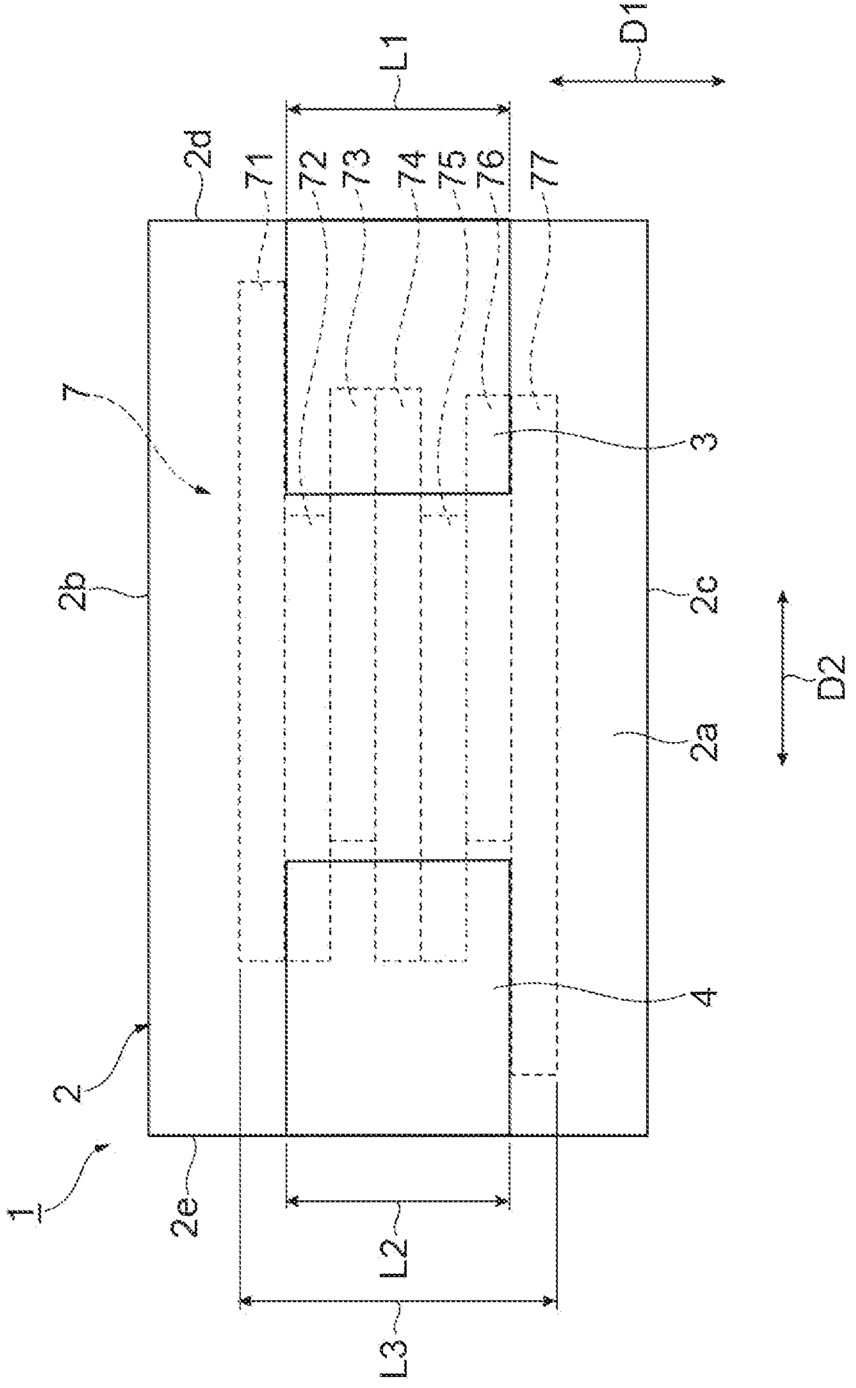
FIG. 3 is a plan view illustrating the multilayer coil component according to the first embodiment.
Figure 4:
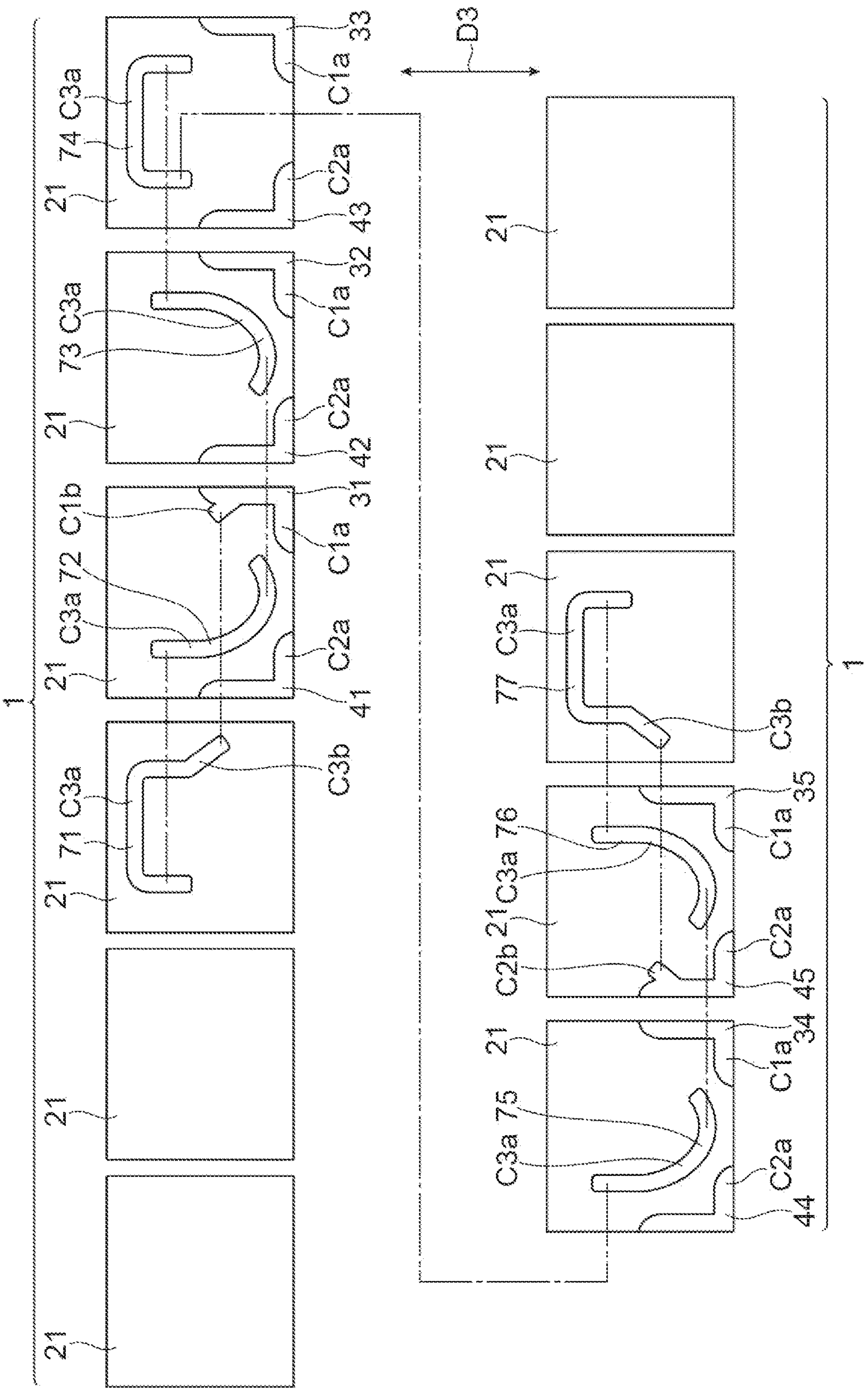
FIG. 4 is an exploded view illustrating the configuration of the multilayer coil component according to the first embodiment.

The configuration of a multilayer coil component 1 according to a first embodiment will be described with reference to FIGS. 1 to 4. FIGS. 1 and 2 are perspective views illustrating the multilayer coil component according to the present embodiment. FIG. 3 is a plan view illustrating the multilayer coil component. FIG. 4 is an exploded view illustrating the configuration of the multilayer coil component. The multilayer coil component 1 includes an element body 2, a pair of external electrodes 3 and 4, and a coil 7.

The element body 2 has a rectangular parallelepiped shape. The rectangular parallelepiped shape includes the shape of a rectangular parallelepiped with chamfered corner and ridge portions and the shape of a rectangular parallelepiped with rounded corner and ridge portions. The element body 2 includes a main surface 2*a*, a pair of side surfaces 2*b* and 2*c*, and a pair of end surfaces 2*d* and 2*e*. The pair of side surfaces 2*b* and 2*c* oppose each other. The direction in which the pair of side surfaces 2*b* and 2*c* oppose each other is a first direction D1. The pair of end surfaces 2*d* and 2*e* oppose each other. The direction in which the pair of end surfaces 2*d* and 2*e* oppose each other is a second direction D2. A third direction D3 is perpendicular to the main surface 2*a*. In the present embodiment, the first direction D1 is the lateral direction of the element body 2. The second direction D2 is the longitudinal direction of the element body 2 and is orthogonal to the first direction D1. The third direction D3 is the height direction of the element body 2 and is orthogonal to the first direction D1 and the second direction D2. For example, the side surface 2*c* is a second side surface when the side surface 2*b* is a first side surface.

The main surface 2*a* is along the first direction D1 and the second direction D2. The pair of side surfaces 2*b* and 2*c* are along the second direction D2 and the third direction D3. The pair of end surfaces 2*d* and 2*e* are along the first direction D1 and the third direction D3. The main surface 2*a* connects the pair of side surfaces 2*b* and 2*c*. The main surface 2*a* connects the pair of end surfaces 2*d* and 2*e*. The multilayer coil component 1 is, for example, solder-mounted on an electronic device. The electronic device is, for example, a circuit board or an electronic component. In the multilayer coil component 1, the main surface 2*a* configures a mounting surface facing the electronic device.

The element body 2 includes a plurality of insulator layers 21 illustrated in FIG. 4. The element body 2 includes the plurality of insulator layers 21 stacked in the first direction D1. In the actual element body 2, the insulator layers 21 may be integrated to the extent that the boundaries between the insulator layers 21 cannot be visually recognized. Each insulator layer 21 includes, for example, a magnetic material. The magnetic material includes, for example, a Ni—Cu—Zn-based ferrite material, a Ni—Cu—Zn—Mg-based ferrite material, or a Ni—Cu-based ferrite material. Each insulator layer 21 includes, for example, a sintered body of a green sheet containing the magnetic material. The magnetic material configuring each insulator layer 21 may contain a Fe alloy. Each insulator layer 21 may include a non-magnetic material. The non-magnetic material includes, for example, a glass ceramic material or a dielectric material.

The pair of external electrodes 3 and 4 are electrically connected to the coil 7. The pair of external electrodes 3 and 4 are disposed in the element body 2. As illustrated in FIG. 3, the pair of external electrodes 3 and 4 are respectively disposed in both end portions of the element body 2 in the second direction D2. The pair of external electrodes 3 and 4 are separated from each other in the second direction D2. For example, the external electrode 4 is a second external electrode when the external electrode 3 is a first external electrode. The external electrode 3 is disposed closer to the end surface 2*d* than the external electrode 4. The external electrode 4 is disposed closer to the end surface 2*e* than the external electrode 3. Each of the external electrodes 3 and 4 is embedded in the element body 2. Each of the external electrodes 3 and 4 has a substantially L shape when viewed from the first direction D1. In the present embodiment, the external electrode 3 is exposed only on the main surface 2*a* and the end surface 2*d*. The surfaces of the external electrode 3 exposed from the element body 2 are flush with the main surface 2*a* and the end surface 2*d*. The external electrode 4 is exposed only on the main surface 2*a* and the end surface 2*e*. The surfaces of the external electrode 4 exposed from the element body 2 are flush with the main surface 2*a* and the end surface 2*e*.

The external electrode 3 includes electrode parts 3*a* and 3*b*. The electrode part 3*a* is formed integrally with the electrode part 3*b*. The electrode part 3*a* is connected to the electrode part 3*b* in the ridge portion of the element body 2. The electrode part 3*a* extends along the first direction D1 and the third direction D3. The electrode part 3*a* has a rectangular shape when viewed from the second direction D2. The electrode part 3*a* has a thickness in the second direction D2. The electrode part 3*b* extends along the first direction D1 and the second direction D2. The electrode part 3*b* has a rectangular shape when viewed from the third direction D3. The electrode part 3*b* has a thickness in the third direction D3.

The external electrode 3 includes a plurality of electrode conductors 31, 32, 33, 34, and 35 illustrated in FIG. 4. The external electrode 3 includes the plurality of electrode conductors 31 to 35 stacked in the first direction D1. In the present embodiment, the number of the plurality of electrode conductors 31 to 35 is "5". The electrode conductor 31, the electrode conductor 32, the electrode conductor 33, the electrode conductor 34, and the electrode conductor 35 are stacked in this order in the direction from the side surface 2*b* toward the side surface 2*c*. The plurality of electrode conductors 31 to 35 are disposed in the first direction D1 and interconnected. The plurality of electrode conductors 31 to 35 being interconnected means that the plurality of electrode conductors 31 to 35 are electrically and physically interconnected. In the actual external electrode 3, the electrode conductors 31 to 35 may be integrated to the extent that the boundaries between the electrode conductors 31 to 35 cannot be visually recognized.

Each of the electrode conductors 31 to 35 includes a conductive material. The conductive material is, for example, Ag or Pd. Each of the electrode conductors 31 to 35 is, for example, a sintered body of a conductive paste including a conductive metal powder. The conductive material powder is, for example, Ag powder or Pd powder. A plating layer may be formed on the surface of the external electrode 3. The plating layer is formed through for example, electroplating or electroless plating. The plating layer includes, for example, Ni, Sn, or Au.

The electrode conductor 31 is an outermost electrode conductor positioned outermost in the first direction D1 among the plurality of electrode conductors 31 to 35. The electrode conductor 31 is a first outermost electrode conductor positioned closest to the side surface 2*b* among the plurality of electrode conductors 31 to 35. The electrode conductor 31 includes conductor parts C1*a* and C1*b*. The conductor part C1*a* is a first conductor part exposed at least on the main surface 2*a*. In the present embodiment, the conductor part C1*a* is exposed on the main surface 2*a* and the end surface 2*d*. The conductor part C1*a* has a substantially L shape when viewed from the first direction D1. The conductor part C1*b* is a second conductor part protruding into the element body 2 when viewed from the first direction D1. The conductor part C1*b* extends in a direction intersecting the second direction D2 and the third direction D3 when viewed from the first direction D1. The conductor part C1*b* is continuous with the conductor part C1*a* of the electrode conductor 31.

The electrode conductors 32 to 34 are positioned between the electrode conductor 31 and the electrode conductor 35 in the first direction D1. The electrode conductor 35 is an outermost electrode conductor positioned outermost in the first direction D1 among the plurality of electrode conductors 31 to 35. The electrode conductor 35 is a second outermost electrode conductor positioned closest to the side surface 2*c* among the plurality of electrode conductors 31 to 35. As in the case of the electrode conductor 31, each of the electrode conductors 32 to 35 includes the conductor part C1*a* exposed at least on the main surface 2*a*. In the present embodiment, the shape and position of the conductor part C1*a* of each of the electrode conductors 32 to 35 are the same as the shape and position of the conductor part C1*a* of the electrode conductor 31. The conductor parts C1*a* of the plurality of electrode conductors 31 to 35 overlap when viewed from the first direction D1. Unlike the electrode conductor 31, each of the electrode conductors 32 to 35 does not include the conductor part C1*b*.

The external electrode 4 includes electrode parts 4*a* and 4*b*. The electrode part 4*a* is formed integrally with the electrode part 4*b*. The electrode part 4*a* is connected to the electrode part 4*b* in the ridge portion of the element body 2. The electrode part 4*a* extends along the first direction D1 and the third direction D3. The electrode part 4*a* has a rectangular shape when viewed from the second direction D2. The electrode part 4*a* has a thickness in the second direction D2. The electrode part 4*b* extends along the first direction D1 and the second direction D2. The electrode part 4*b* has a rectangular shape when viewed from the third direction D3. The electrode part 4*b* has a thickness in the third direction D3.

The external electrode 4 includes a plurality of electrode conductors 41, 42, 43, 44, and 45 illustrated in FIG. 4. The external electrode 4 includes the plurality of electrode conductors 41 to 45 stacked in the first direction D1. In the present embodiment, the number of the plurality of electrode conductors 41 to 45 is "5". The electrode conductor 41, the electrode conductor 42, the electrode conductor 43, the electrode conductor 44, and the electrode conductor 45 are stacked in this order in the direction from the side surface 2*b* toward the side surface 2*c*. The plurality of electrode conductors 41 to 45 are disposed in the first direction D1 and interconnected. The plurality of electrode conductors 41 to 45 being interconnected means that the plurality of electrode conductors 41 to 45 are electrically and physically interconnected. In the actual external electrode 4, the electrode conductors 41 to 45 may be integrated to the extent that the boundaries between the electrode conductors 41 to 45 cannot be visually recognized.

Each of the electrode conductors 41 to 45 includes a conductive material. The conductive material is, for example, Ag or Pd. Each of the electrode conductors 41 to 45 is, for example, a sintered body of a conductive paste including a conductive metal powder. The conductive material powder is, for example, Ag powder or Pd powder. A plating layer may be formed on the surface of the external electrode 4. The plating layer is formed through, for example, electroplating or electroless plating. The plating layer includes, for example, Ni, Sn, or Au.

The electrode conductor 41 is an outermost electrode conductor positioned outermost in the first direction D1 among the plurality of electrode conductors 41 to 45. The electrode conductor 41 is a first outermost electrode conductor positioned closest to the side surface 2*b* among the plurality of electrode conductors 41 to 45. The electrode conductor 41 includes a conductor part C2*a*. The conductor part C2*a* is a first conductor part exposed at least on the main surface 2*a*. In the present embodiment, the conductor part C2*a* is exposed on the main surface 2*a* and the end surface 2*e*. The conductor part C2*a* has a substantially L shape when viewed from the first direction D1.

The electrode conductors 42 to 44 are positioned between the electrode conductor 41 and the electrode conductor 45 in the first direction D1. As in the case of the electrode conductor 41, each of the electrode conductors 42 to 44 includes the conductor part C2*a* exposed at least on the main surface 2*a*. In the present embodiment, the shape and position of the conductor part C2*a* of each of the electrode conductors 42 to 44 are the same as the shape and position of the conductor part C2*a* of the electrode conductor 41.

The electrode conductor 45 is an outermost electrode conductor positioned outermost in the first direction D1 among the plurality of electrode conductors 41 to 45. The electrode conductor 45 is a second outermost electrode conductor positioned closest to the side surface 2*c* among the plurality of electrode conductors 41 to 45. The electrode conductor 45 includes the conductor part C2*a* and a conductor part C2*b*. In the present embodiment, the shape and position of the conductor part C2*a* of the electrode conductor 45 are the same as the shape and position of the conductor part C2*a* of the electrode conductor 41. The conductor parts C2*a* of the plurality of electrode conductors 41 to 45 overlap when viewed from the first direction D1. The conductor part C2*b* is a second conductor part protruding into the element body 2 when viewed from the first direction D1. The conductor part C2*b* extends in a direction intersecting the second direction D2 and the third direction D3 when viewed from the first direction D1. The conductor part C2*b* is continuous with the conductor part C2*a* of the electrode conductor 45.

As illustrated in FIG. 3, the coil 7 is disposed in the element body 2 such that the coil axis direction of the coil 7 is along the first direction D1. The coil 7 includes a plurality of coil conductors 71, 72, 73, 74, 75, 76, and 77. The coil 7 includes the plurality of coil conductors 71 to 77 stacked in the first direction D1. In the present embodiment, the number of the plurality of coil conductors 71 to 77 is "7". The number of coil conductors of the coil 7 is greater than the number of electrode conductors of each of the pair of external electrodes 3 and 4. Each of the pair of external electrodes 3 and 4 includes fewer layers than the coil 7. The coil conductor 71, the coil conductor 72, the coil conductor 73, the coil conductor 74, the coil conductor 75, the coil conductor 76, and the coil conductor 77 are stacked in this order in the direction from the side surface 2*b* toward the side surface 2*c*. The plurality of coil conductors 71 to 77 are disposed in the first direction D1, that is, the coil axis direction of the coil 7.

The plurality of coil conductors 71 to 77 are interconnected. The plurality of coil conductors 71 to 77 being interconnected means that the plurality of coil conductors 71 to 77 are electrically and physically interconnected. In the actual coil 7, the coil conductors 71 to 77 may be integrated to the extent that the boundaries between the coil conductors 71 to 77 cannot be visually recognized.

Each of the coil conductors 71 to 77 includes a conductive material. The conductive material is, for example, Ag or Pd. Each of the coil conductors 71 to 77 is, for example, a sintered body of a conductive paste including a conductive metal powder. The conductive material powder is, for example, Ag powder or Pd powder. Each of the coil conductors 71 to 77 may include the same conductive material as the conductive material of each of the external electrodes 3 and 4. Each of the coil conductors 71 to 77 may include a conductive material different from the conductive material of each of the external electrodes 3 and 4.

As illustrated in FIG. 3, the coil conductor 71 is an outermost coil conductor positioned outermost in the coil axis direction of the coil 7 among the plurality of coil conductors 71 to 77. The coil conductor 71 is positioned at an end of the coil 7 in the coil axis direction of the coil 7. The coil conductor 71 is positioned closest to the side surface 2*b* among the plurality of coil conductors 71 to 77. The coil conductor 71 is a second coil conductor positioned between the coil conductor 72 and the side surface 2*b*. As illustrated in FIG. 4, the coil conductor 71 is not positioned in the same layer as any of the plurality of electrode conductors 31 to 35 and the plurality of electrode conductors 41 to 45. The electrode conductors 31 and 41 are outermost electrode conductors. The electrode conductors 31 and 41 are not positioned in the same layer as the coil conductor 71. The coil conductor 71 is an outermost coil conductor. The electrode conductors 31 and 41 are positioned inside the coil conductor 71 in the coil 7 in the first direction D1.

The coil conductor 71 includes conductor parts C3*a* and C3*b*. The conductor part C3*a* of the coil conductor 71 is a third conductor part configuring a part of an annular track in the coil 7. The conductor part C3*a* of the coil conductor 71 extends to surround the coil axis of the coil 7. One end of the conductor part C3*a* of the coil conductor 71 is connected to one end of the conductor part C3*a* of the coil conductor 72 in the first direction D1. One end of the conductor part C3*a* of the coil conductor 71 is physically directly connected to one end of the conductor part C3*a* of the coil conductor 72. One end of the conductor part C3*a* of the coil conductor 71 may be integrated with one end of the conductor part C3*a* of the coil conductor 72 to the extent that the boundary therebetween cannot be visually recognized. The conductor part C3*b* of the coil conductor 71 is a fourth conductor part protruding outside the annular track of the coil 7 when viewed from the first direction D1. The conductor part C3*b* of the coil conductor 71 extends in a direction intersecting the second direction D2 and the third direction D3 when viewed from the first direction D1. The conductor part C3*b* of the coil conductor 71 is continuous with the conductor part C3*a* of the coil conductor 71. In the present embodiment, one end of the conductor part C3*b* of the coil conductor 71 is continuous with the other end of the conductor part C3*a* of the coil conductor 71. The other end of the conductor part C3*b* of the coil conductor 71 is connected to the conductor part C1*b* of the electrode conductor 31 in the first direction D1. The other end of the conductor part C3*b* of the coil conductor 71 is physically directly connected to the conductor part C1*b* of the electrode conductor 31. The other end of the conductor part C3*b* of the coil conductor 71 may be integrated with the conductor part C1*b* of the electrode conductor 31 to the extent that the boundary therebetween cannot be visually recognized.

The plurality of coil conductors 72 to 76 are a plurality of first coil conductors positioned in the same layer as the plurality of electrode conductors 31 to 35 and the plurality of electrode conductors 41 to 45. As in the case of the coil conductor 71, each of the coil conductors 72 to 76 includes the conductor part C3*a* configuring a part of the annular track in the coil 7. The conductor part C3*a* of each of the coil conductors 72 to 76 extends to surround the coil axis of the coil 7. The coil conductor 72 is positioned in the same layer as the electrode conductors 31 and 41. The coil conductor 72 is positioned closest to the side surface 2*b* among the plurality of coil conductors 72 to 76. The other end of the conductor part C3*a* of the coil conductor 72 is connected to one end of the conductor part C3*a* of the coil conductor 73 in the first direction D1. The other end of the conductor part C3*a* of the coil conductor 72 is physically directly connected to one end of the conductor part C3*a* of the coil conductor 73. The other end of the conductor part C3*a* of the coil conductor 72 may be integrated with one end of the conductor part C3*a* of the coil conductor 73 to the extent that the boundary therebetween cannot be visually recognized.

The coil conductor 73 is positioned in the same layer as the electrode conductors 32 and 42. The other end of the conductor part C3*a* of the coil conductor 73 is connected to one end of the conductor part C3*a* of the coil conductor 74 in the first direction D1. The other end of the conductor part C3*a* of the coil conductor 73 is physically directly connected to one end of the conductor part C3*a* of the coil conductor 74. The other end of the conductor part C3*a* of the coil conductor 73 may be integrated with one end of the conductor part C3*a* of the coil conductor 74 to the extent that the boundary therebetween cannot be visually recognized. The coil conductor 74 is positioned in the same layer as the electrode conductors 33 and 43. The other end of the conductor part C3*a* of the coil conductor 74 is connected to one end of the conductor part C3*a* of the coil conductor 75 in the first direction D1. The other end of the conductor part C3*a* of the coil conductor 74 is physically directly connected to one end of the conductor part C3*a* of the coil conductor 75. The other end of the conductor part C3*a* of the coil conductor 74 may be integrated with one end of the conductor part C3*a* of the coil conductor 75 to the extent that the boundary therebetween cannot be visually recognized.

The coil conductor 75 is positioned in the same layer as the electrode conductors 34 and 44. The other end of the conductor part C3*a* of the coil conductor 75 is connected to one end of the conductor part C3*a* of the coil conductor 76 in the first direction D1. The other end of the conductor part C3*a* of the coil conductor 75 is physically directly connected to one end of the conductor part C3*a* of the coil conductor 76. The other end of the conductor part C3*a* of the coil conductor 75 may be integrated with one end of the conductor part C3*a* of the coil conductor 76 to the extent that the boundary therebetween cannot be visually recognized. The coil conductor 76 is positioned in the same layer as the electrode conductors 35 and 45. The coil conductor 76 is positioned closest to the side surface 2*c* among the plurality of coil conductors 72 to 76. The other end of the conductor part C3*a* of the coil conductor 76 is connected to one end of the conductor part C3*a* of the coil conductor 77 in the first direction D1. The other end of the conductor part C3*a* of the coil conductor 76 is physically directly connected to one end of the conductor part C3*a* of the coil conductor 77. The other end of the conductor part C3*a* of the coil conductor 76 may be integrated with one end of the conductor part C3*a* of the coil conductor 77 to the extent that the boundary therebetween cannot be visually recognized.

As illustrated in FIG. 3, the coil conductor 77 is an outermost coil conductor positioned outermost in the coil axis direction of the coil 7 among the plurality of coil conductors 71 to 77. The coil conductor 77 is positioned at an end of the coil 7 in the coil axis direction of the coil 7. The coil conductor 77 is positioned closest to the side surface 2*c* among the plurality of coil conductors 71 to 77. The coil conductor 77 is a third coil conductor positioned between the coil conductor 76 and the side surface 2*c*. As illustrated in FIG. 4, the coil conductor 77 is not positioned in the same layer as any of the plurality of electrode conductors 31 to 35 and the plurality of electrode conductors 41 to 45. The electrode conductors 35 and 45 are outermost electrode conductors. The electrode conductors 35 and 45 are not positioned in the same layer as the coil conductor 77. The coil conductor 77 is an outermost coil conductor. The electrode conductors 35 and 45 are positioned inside the coil conductor 77 in the coil 7 in the first direction D1.

As in the case of the coil conductor 71, the coil conductor 77 includes the conductor parts C3*a* and C3*b*. The conductor part C3*a* of the coil conductor 77 is a third conductor part configuring a part of the annular track in the coil 7. The conductor part C3*a* of the coil conductor 77 extends to surround the coil axis of the coil 7. The conductor part C3*b* of the coil conductor 77 is a fourth conductor part protruding outside the annular track of the coil 7 when viewed from the first direction D1. The conductor part C3*b* of the coil conductor 77 extends in a direction intersecting the second direction D2 and the third direction D3 when viewed from the first direction D1. The conductor part C3*b* of the coil conductor 77 is continuous with the conductor part C3*a* of the coil conductor 77. In the present embodiment, one end of the conductor part C3*b* of the coil conductor 77 is continuous with the other end of the conductor part C3*a* of the coil conductor 77. The other end of the conductor part C3*b* of the coil conductor 77 is connected to the conductor part C2*b* of the electrode conductor 45 in the first direction D1. The other end of the conductor part C3*b* of the coil conductor 77 is physically directly connected to the conductor part C2*b* of the electrode conductor 45. The other end of the conductor part C3*b* of the coil conductor 77 may be integrated with the conductor part C2*b* of the electrode conductor 45 to the extent that the boundary therebetween cannot be visually recognized.

As illustrated in FIG. 3, when each of the pair of external electrodes 3 and 4 and the coil 7 are viewed from the third direction D3, both ends of the coil 7 in the first direction D1 are exposed from each of the pair of external electrodes 3 and 4 in the first direction D1. Both ends of the coil 7 being exposed from each of the pair of external electrodes 3 and 4 when viewed from the third direction D3 means that both ends of the coil 7 do not overlap each of the pair of external electrodes 3 and 4 when viewed from the third direction D3. In the present embodiment, the pair of coil conductors 71 and 77 are entirely exposed from each of the pair of external electrodes 3 and 4 when viewed from the third direction D3.

A length L1 of the external electrode 3 and a length L2 of the external electrode 4 in the first direction D1 are smaller than a length L3 of the coil 7 in the first direction D1. The length L1 is, for example, defined by the maximum width of the external electrode 3 in the first direction D1. The length L2 is, for example, defined by the maximum width of the external electrode 4 in the first direction D1. The length L3 is, for example, defined by the interval in the first direction D1 between a virtual plane parallel to the side surface 2*b* and in contact with the coil conductor 71 and a virtual plane parallel to the side surface 2*c* and in contact with the coil conductor 77. In the present embodiment, the length L3 is the interval in the first direction D1 between the surface of the coil conductor 71 close to the side surface 2*b* and the surface of the coil conductor 77 close to the side surface 2*c*. As an example, in a case where the element body 2 is 0201 size, the lengths L1 and L2 are, for example, 70 μm or more and 100 μm or less and the length L3 is, for example, 85 μm or more and 115 μm or less. The 0201 size means that the length of the element body 2 in the second direction D2 is 0.250 mm and the length of the element body 2 in the first direction D1 is 0.125 mm. The lengths L1, L2, and L3 may differ from the above lengths depending on the size of the element body 2.

Figure 5:
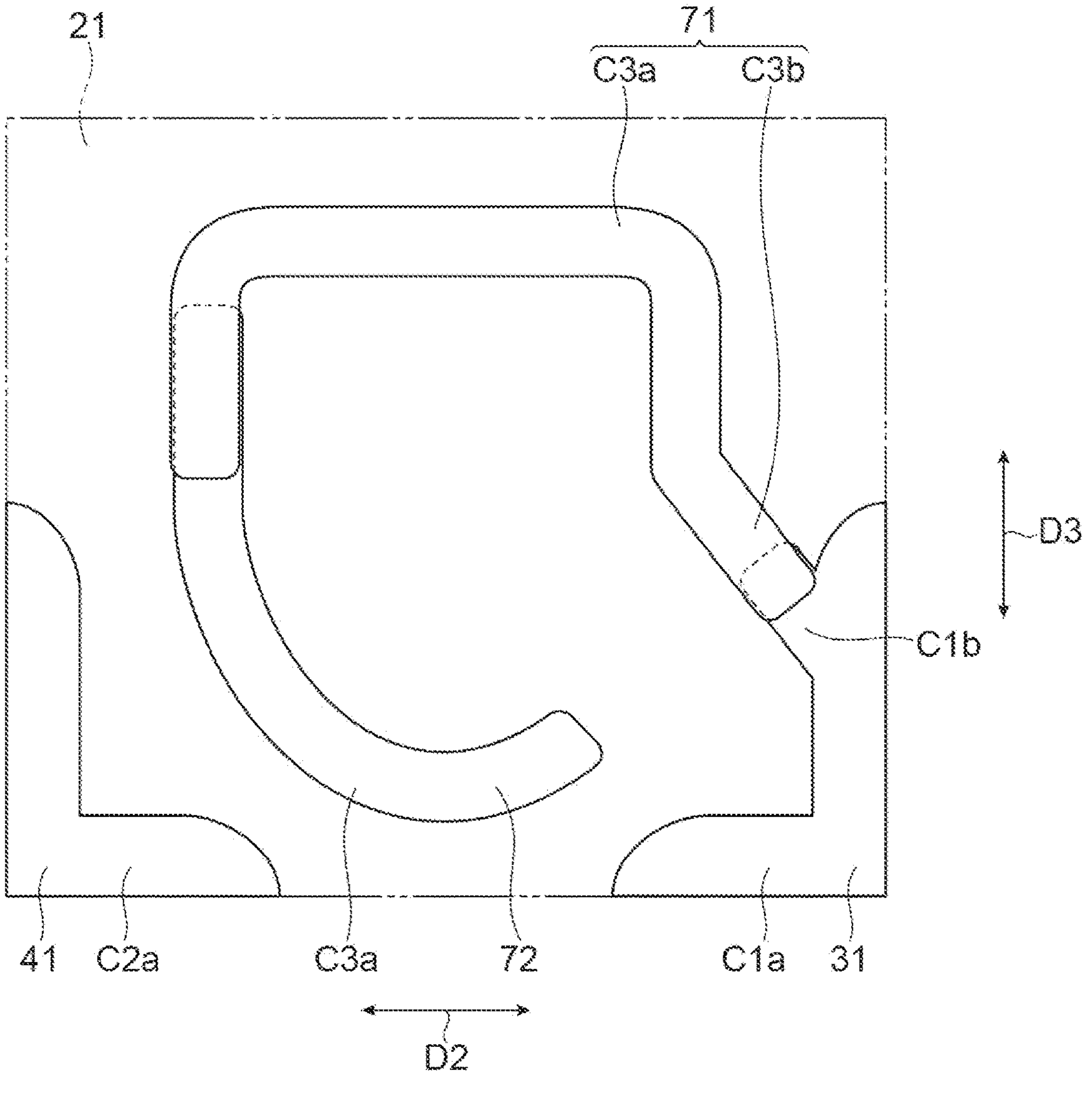
FIG. 5 is a diagram illustrating the configurations of a coil conductor and an electrode conductor.

The configuration of connection between the coil conductor 71 and the electrode conductor 31 and the configuration of connection between the coil conductor 71 and the coil conductor 72 will be described with reference to FIG. 5. FIG. 5 is a diagram illustrating the layer including the coil conductor 71 and the layer including the coil conductor 72. For description, in the illustration of FIG. 5, the conductor part C3*b* of the coil conductor 71 and the conductor part C1*b* of the electrode conductor 31 are intentionally misaligned. In the actual multilayer coil component 1, the outer edge of the conductor part C3*b* of the coil conductor 71 along the extension direction includes a part overlapping the outer edge of the conductor part C1*b* of the electrode conductor 31 along the extension direction. Likewise, in the illustration of FIG. 5, the conductor part C3*a* of the coil conductor 71 and the conductor part C3*a* of the coil conductor 72 are intentionally misaligned. In the actual multilayer coil component 1, the outer edge of the conductor part C3*a* of the coil conductor 71 along the extension direction includes a part overlapping the outer edge of the conductor part C3*a* of the coil conductor 72 along the extension direction.

As illustrated in FIG. 5, the coil conductor 71 overlaps the electrode conductor 31 when viewed from the first direction D1 and is electrically connected to the electrode conductor 31. In the present embodiment, the end portion of the conductor part C3*b* of the coil conductor 71 overlaps a part of the conductor part C1*b* of the electrode conductor 31 when viewed from the first direction D1. The conductor part C3*b* of the coil conductor 71 and the conductor part C1*b* of the electrode conductor 31 are connected in the first direction D1 at the overlapping parts. In the actual multilayer coil component 1, the conductor part C3*b* of the coil conductor 71 may be integrated with the conductor part C1*b* of the electrode conductor 31 to the extent that the boundary between the conductor part C3*b* of the coil conductor 71 and the conductor part C1*b* of the electrode conductor 31 cannot be visually recognized. The conductor part C3*b* of the coil conductor 71 is physically and electrically connected to the conductor part C1*b* of the electrode conductor 31. The width of the conductor part C3*b* of the coil conductor 71 is equivalent to the width of the conductor part C1*b* of the electrode conductor 31. Hereinafter, "equivalent" does not necessarily mean only that the values match. The values may be considered equivalent even in a case where the values include a slight difference in a preset range, a manufacturing error, or a measurement error.

The coil conductor 71 overlaps the coil conductor 72 when viewed from the first direction D1 and is electrically connected to the coil conductor 72. In the present embodiment, of both end portions of the conductor part C3*a* of the coil conductor 71, the end portion that is not continuous with the conductor part C3*b* overlaps the end portion of the conductor part C3*a* of the coil conductor 72 when viewed from the first direction D1. In the present embodiment, the conductor part C3*a* of the coil conductor 71 and the conductor part C3*a* of the coil conductor 72 are connected in the first direction D1 at the overlapping parts. In the actual multilayer coil component 1, the conductor part C3*a* of the coil conductor 71 may be integrated with the conductor part C3*a* of the coil conductor 72 to the extent that the boundary between the conductor part C3*a* of the coil conductor 71 and the conductor part C3*a* of the coil conductor 72 cannot be visually recognized. The conductor part C3*a* of the coil conductor 71 is physically and electrically connected to the conductor part C3*a* of the coil conductor 72. The width of the conductor part C3*a* of the coil conductor 71 is equivalent to the width of the conductor part C3*a* of the coil conductor 72.

Figure 6:
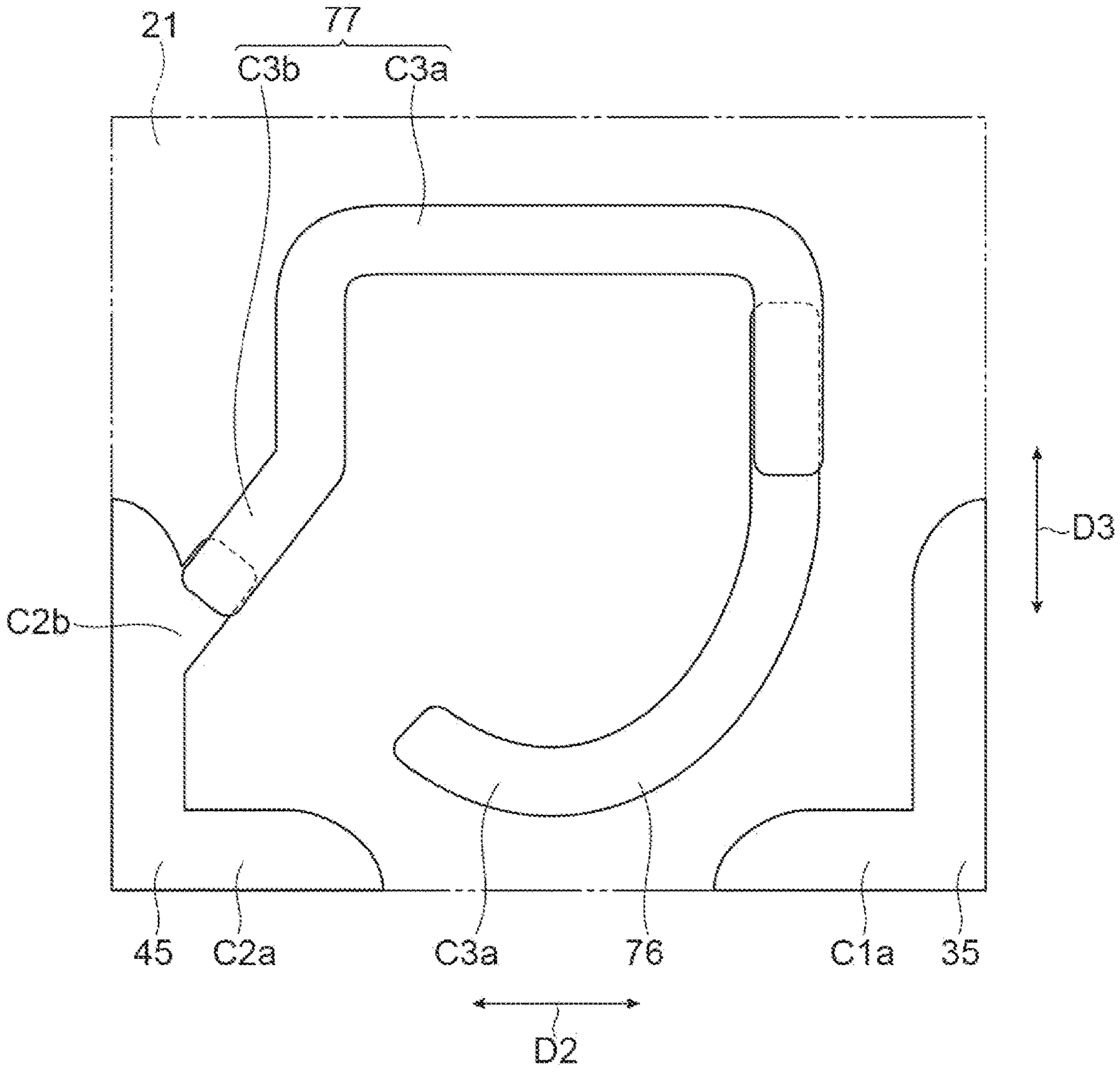
FIG. 6 is a diagram illustrating the configurations of the coil conductor and the electrode conductor.

The configuration of connection between the coil conductor 77 and the electrode conductor 45 and the configuration of connection between the coil conductor 77 and the coil conductor 76 will be described with reference to FIG. 6. FIG. 6 is a diagram illustrating the layer including the coil conductor 76 and the layer including the coil conductor 77. For description, in the illustration of FIG. 6, the conductor part C3*b* of the coil conductor 77 and the conductor part C2*b* of the electrode conductor 45 are intentionally misaligned. In the actual multilayer coil component 1, the outer edge of the conductor part C3*b* of the coil conductor 77 along the extension direction includes a part overlapping the outer edge of the conductor part C2*b* of the electrode conductor 45 along the extension direction. Likewise, in the illustration of FIG. 6, the conductor part C3*a* of the coil conductor 77 and the conductor part C3*a* of the coil conductor 76 are intentionally misaligned. In the actual multilayer coil component 1, the outer edge of the conductor part C3*a* of the coil conductor 77 along the extension direction includes a part overlapping the outer edge of the conductor part C3*a* of the coil conductor 76 along the extension direction.

As illustrated in FIG. 6, the coil conductor 77 overlaps the electrode conductor 45 when viewed from the first direction D1 and is electrically connected to the electrode conductor 45. In the present embodiment, the end portion of the conductor part C3*b* of the coil conductor 77 overlaps a part of the conductor part C2*b* of the electrode conductor 45 when viewed from the first direction D1. The conductor part C3*b* of the coil conductor 77 and the conductor part C2*b* of the electrode conductor 45 are connected in the first direction D1 at the overlapping parts. In the actual multilayer coil component 1, the conductor part C3*b* of the coil conductor 77 may be integrated with the conductor part C2*b* of the electrode conductor 45 to the extent that the boundary between the conductor part C3*b* of the coil conductor 77 and the conductor part C2*b* of the electrode conductor 45 cannot be visually recognized. The conductor part C3*b* of the coil conductor 77 is physically and electrically connected to the conductor part C2*b* of the electrode conductor 45. The width of the conductor part C3*b* of the coil conductor 77 is equivalent to the width of the conductor part C2*b* of the electrode conductor 45.

The coil conductor 77 overlaps the coil conductor 76 when viewed from the first direction D1 and is electrically connected to the coil conductor 76. In the present embodiment, of both end portions of the conductor part C3*a* of the coil conductor 77, the end portion that is not continuous with the conductor part C3*b* overlaps the end portion of the conductor part C3*a* of the coil conductor 76 when viewed from the first direction D1. In the present embodiment, the conductor part C3*a* of the coil conductor 77 and the conductor part C3*a* of the coil conductor 76 are connected in the first direction D1 at the overlapping parts. In the actual multilayer coil component 1, the conductor part C3*a* of the coil conductor 77 may be integrated with the conductor part C3*a* of the coil conductor 76 to the extent that the boundary between the conductor part C3*a* of the coil conductor 77 and the conductor part C3*a* of the coil conductor 76 cannot be visually recognized. The conductor part C3*a* of the coil conductor 77 is physically and electrically connected to the conductor part C3*a* of the coil conductor 76. The width of the conductor part C3*a* of the coil conductor 77 is equivalent to the width of the conductor part C3*a* of the coil conductor 76.

In the multilayer coil component 1, the plurality of electrode conductors 31 to 35 and 41 to 45 are positioned in the same layer as the plurality of coil conductors 72 to 76 and are not positioned in the same layer as the coil conductor 71 and the coil conductor 77. The volume of the external electrodes 3 and 4 with respect to the element body 2 in the first direction D1 is smaller than in a configuration in which a plurality of electrode conductors are also positioned in the same layer as the coil conductor 71 and the coil conductor 77. A configuration in which the number of layers of the coil conductor is equal to the number of layers of the electrode conductor lowers the inductance of the coil 7 in a case where, for example, the number of layers of the coil and electrode conductors is reduced for external electrode volume reduction. On the other hand, according to the configuration of the multilayer coil component 1, the volume of the external electrodes 3 and 4 is reduced while the number of layers of the coil conductor, that is, the value of the inductance of the coil 7 is maintained. In the multilayer coil component 1, the external electrodes 3 and 4 tend not to peel off the element body 2 even in the case of a difference in coefficient of thermal expansion or thermal contraction between the element body 2 and the external electrodes 3 and 4. As a result, deterioration of the characteristics of the multilayer coil component 1 is suppressed. In the multilayer coil component 1, distortion of the multilayer coil component 1 is suppressed even in the case of a difference in coefficient of thermal expansion or thermal contraction between the element body 2 and the external electrodes 3 and 4. Consequently, the mountability of the multilayer coil component 1 on an electronic device is improved.

The electrode conductor 31 and the electrode conductor 45 respectively include the conductor parts C1*a* and C2*a* exposed at least on the main surface 2*a* and the conductor parts C1*b* and C2*b* continuous with the conductor parts C1*a* and C2*a* and protruding into the element body 2 when viewed from the first direction D1. The coil conductor 71 overlaps the conductor part C1*b* of the electrode conductor 31 when viewed from the first direction D1 and is electrically connected to the conductor part C1*b* of the electrode conductor 31. The coil conductor 77 overlaps the conductor part C2*b* of the electrode conductor 45 when viewed from the first direction D1 and is electrically connected to the conductor part C2*b* of the electrode conductor 45. Consequently, the coil 7 is reliably connected to the external electrodes 3 and 4.

Each of the coil conductor 71 and the coil conductor 77 includes the conductor part C3*a* configuring a part of the annular track in the coil 7 and the conductor part C3*b* continuous with the conductor part C3*a* and protruding outside the annular track when viewed from the first direction D1. The conductor part C3*b* of the coil conductor 71 overlaps the conductor part C1*b* of the electrode conductor 31 when viewed from the first direction D1 and is electrically connected to the conductor part C1*b* of the electrode conductor 31. The conductor part C3*b* of the coil conductor 77 overlaps the conductor part C2*b* of the electrode conductor 45 when viewed from the first direction D1 and is electrically connected to the conductor part C2*b* of the electrode conductor 45. Consequently, the coil 7 is reliably connected to the external electrodes 3 and 4.

The conductor part C1*b* of the electrode conductor 31 and the conductor part C3*b* of the coil conductor 71 are connected to each other in the first direction D1. The conductor part C2*b* of the electrode conductor 45 and the conductor part C3*b* of the coil conductor 77 are connected to each other in the first direction D1. Accordingly, the conductor parts C1*b* and C2*b* and the conductor part C3*b* positioned in different layers are appropriately connected, and the electrical connection between the coil 7 and the external electrodes 3 and 4 is more reliably maintained. As a result, deterioration of the characteristics of the multilayer coil component 1 is suppressed.

The lengths of the external electrodes 3 and 4 in the first direction D1 are smaller than the length of the coil 7 in the first direction D1. In the multilayer coil component 1, the volume of the external electrodes 3 and 4 with respect to the element body 2 in the first direction D1 is smaller than in a configuration in which the lengths of the external electrodes 3 and 4 in the first direction D1 are equal to or greater than the length of the coil 7 in the first direction D1. In the multilayer coil component 1, the external electrodes 3 and 4 tend not to peel off the element body 2 even in the case of a difference in coefficient of thermal expansion or thermal contraction between the element body 2 and the external electrodes 3 and 4. As a result, deterioration of the characteristics of the multilayer coil component 1 is suppressed.

When the external electrodes 3 and 4 and the coil 7 are viewed from the third direction D3, both ends of the coil 7 in the first direction D1 are exposed from the external electrodes 3 and 4 in the first direction D1. The lengths of the external electrodes 3 and 4 in the first direction D1 are smaller than the length of the coil 7 in the first direction D1. In the multilayer coil component 1, the volume of the external electrodes 3 and 4 with respect to the element body 2 in the first direction D1 is smaller than in a configuration in which both ends of the coil 7 in the first direction D1 are not exposed from the external electrodes 3 and 4 in the first direction D1. In the multilayer coil component 1, the external electrodes 3 and 4 tend not to peel off the element body 2 even in the case of a difference in coefficient of thermal expansion or thermal contraction between the element body 2 and the external electrodes 3 and 4. As a result, deterioration of the characteristics of the multilayer coil component 1 is suppressed.

The external electrodes 3 and 4 are exposed only on the corresponding end surfaces 2*d* and 2*e* of the pair of end surfaces 2*d* and 2*e* and the main surface 2*a*. Consequently, when the multilayer coil component 1 is mounted on an electronic device, a sufficient region of contact with the electronic device is ensured in the exposed surfaces of the external electrodes 3 and 4.

In the multilayer coil component 1, the coil 7 includes the plurality of coil conductors 71 to 77 disposed in the coil axis direction, and the external electrodes 3 and 4 include the plurality of electrode conductors 31 to 35 and 41 to 45 disposed in the coil axis direction. Each of the electrode conductors 31, 35, 41, and 45 is not positioned in the same layer as the coil conductors 71 and 77. In the multilayer coil component 1, the volume of the external electrodes 3 and 4 with respect to the element body 2 in the first direction D1 is smaller than in a configuration in which each of the electrode conductors 31, 35, 41, and 45 is positioned in the same layer as the coil conductors 71 and 77. In the multilayer coil component 1, the external electrodes 3 and 4 tend not to peel off the element body 2 even in the case of a difference in coefficient of thermal expansion or thermal contraction between the element body 2 and the external electrodes 3 and 4. As a result, deterioration of the characteristics of the multilayer coil component 1 is suppressed.

Modification Example

Figure 7:
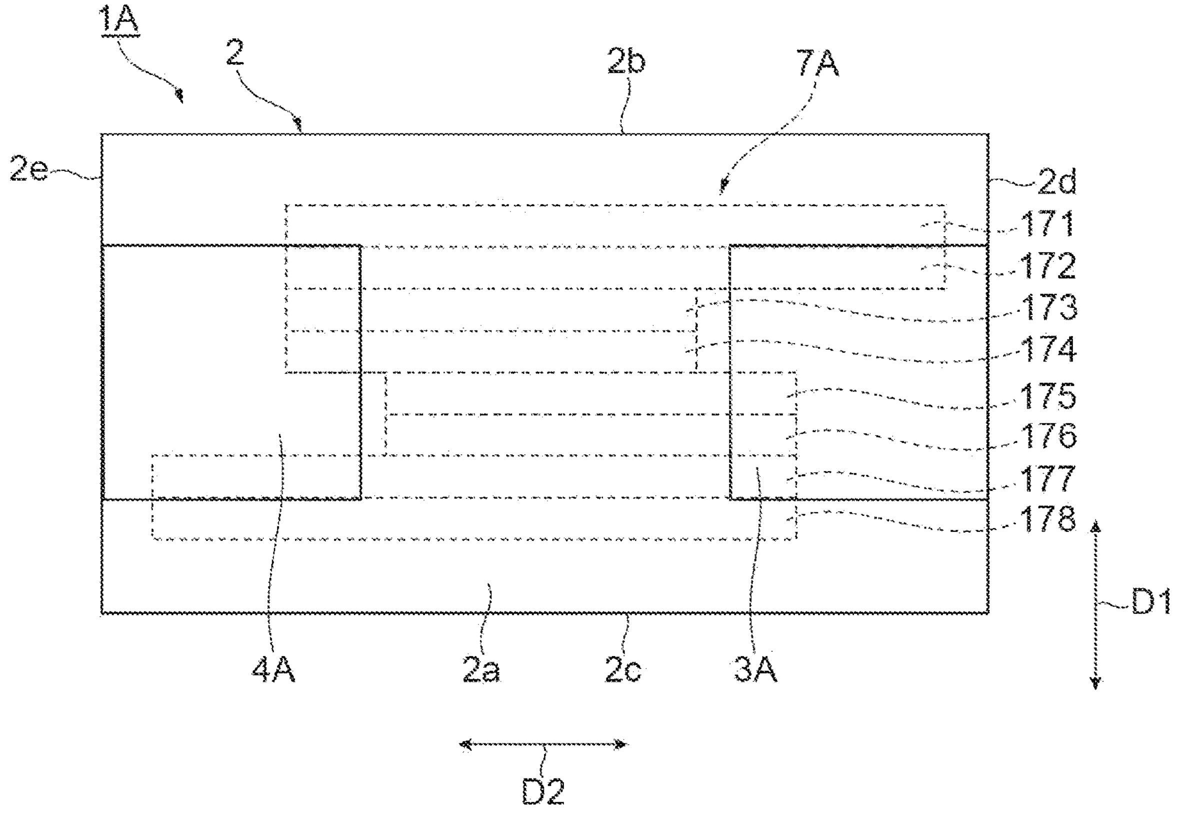
FIG. 7 is a plan view illustrating a multilayer coil component according to a modification example.
Figure 8:
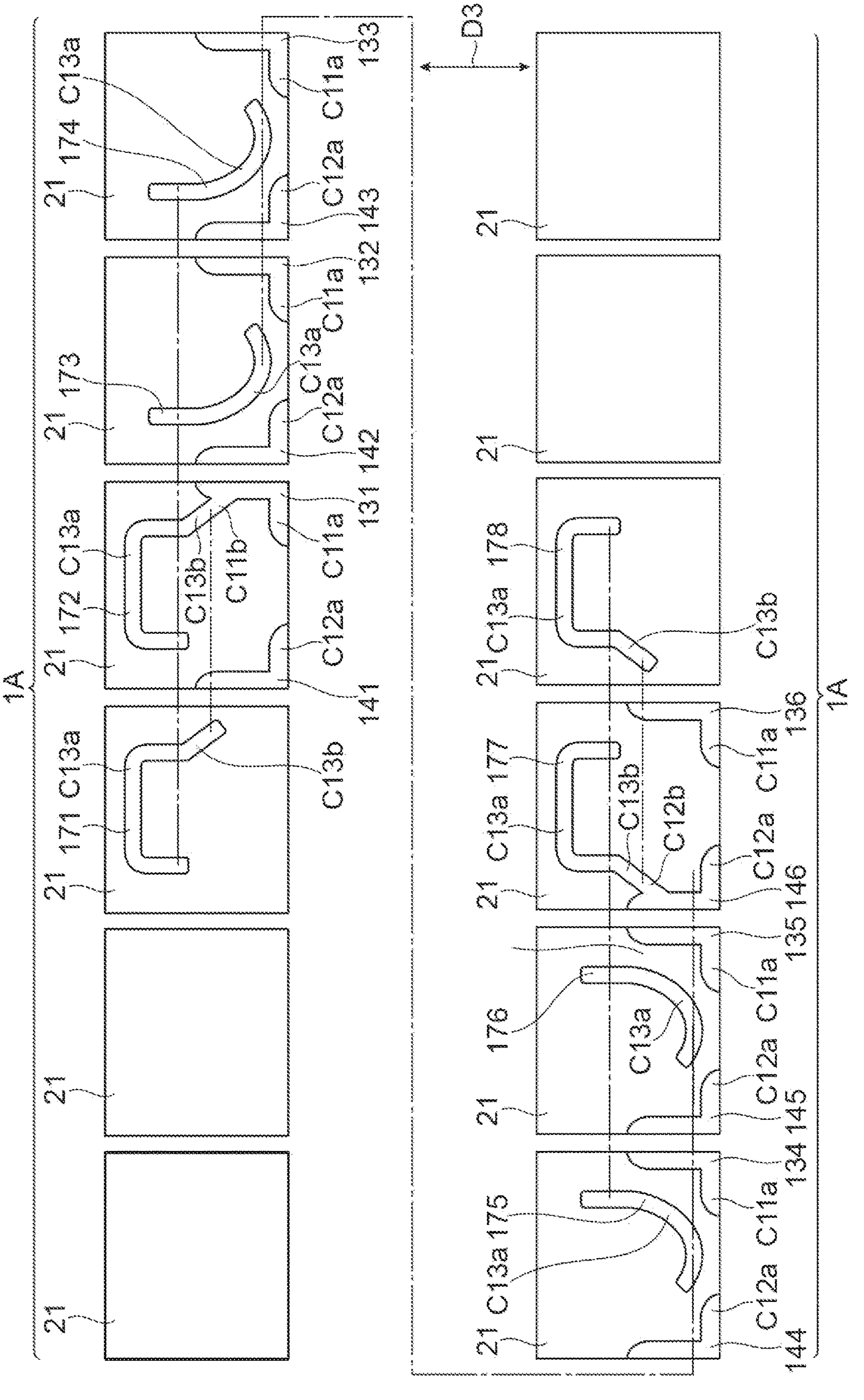
FIG. 8 is an exploded view illustrating the configuration of the multilayer coil component according to the modification example.

Next, the configuration of a multilayer coil component 1A according to a modification example of the present embodiment will be described with reference to FIGS. 7 and 8. FIG. 7 is a plan view illustrating the multilayer coil component 1A according to the modification example. FIG. 8 is an exploded view illustrating the configuration of the multilayer coil component 1A according to the modification example. This modification example differs from the above first embodiment in terms of electrode conductor and coil conductor configurations. The differences between the above first embodiment and this modification example will be mainly described below.

The multilayer coil component 1A includes the element body 2, a pair of external electrodes 3A and 4A, and a coil 7A. The external electrode 3A includes a plurality of electrode conductors 131, 132, 133, 134, 135, and 136 illustrated in FIG. 8. The external electrode 3A includes the plurality of electrode conductors 131 to 136 stacked in the first direction D1. In this modification example, the number of the plurality of electrode conductors 131 to 136 is "6". The electrode conductor 131, the electrode conductor 132, the electrode conductor 133, the electrode conductor 134, the electrode conductor 135, and the electrode conductor 136 are stacked in this order in the direction from the side surface 2*b* toward the side surface 2*c*. The plurality of electrode conductors 131 to 136 are disposed in the first direction D1 and interconnected. The plurality of electrode conductors 131 to 136 are physically directly interconnected. The electrode conductors 131 to 136 may be integrated to the extent that the boundaries between the electrode conductors 131 to 136 cannot be visually recognized.

The electrode conductor 131 is an outermost electrode conductor positioned outermost in the first direction D1 among the plurality of electrode conductors 131 to 136. The electrode conductor 131 is a first outermost electrode conductor positioned closest to the side surface 2*b* among the plurality of electrode conductors 131 to 136. The electrode conductor 131 includes conductor parts C11*a* and C11*b*. The conductor part C11*a* is a first conductor part exposed at least on the main surface 2*a*. As in the above first embodiment, in this modification example, the conductor part C11*a* is exposed on the main surface 2*a* and the end surface 2*d*. The conductor part C11*a* has a substantially L shape when viewed from the first direction D1. The conductor part C11*b* is a second conductor part protruding into the element body 2 when viewed from the first direction D1. The conductor part C11*b* extends in a direction intersecting the second direction D2 and the third direction D3 when viewed from the first direction D1. One of both ends of the conductor part C11*b* is continuous with the conductor part C11*a* of the electrode conductor 131. In the above embodiment, as illustrated in FIG. 4, of both ends of the conductor part C1*b*, the end portion that is not continuous with the conductor part C1*a* is not continuous with the coil conductor 72 positioned in the same layer as the electrode conductor 31. In this modification example, as illustrated in FIG. 8, of both ends of the conductor part C11*b*, the end portion that is not continuous with the conductor part C11*a* is continuous with a coil conductor 172 positioned in the same layer as the electrode conductor 131.

The electrode conductors 132 to 135 are positioned between the electrode conductor 131 and the electrode conductor 136 in the first direction D1. The electrode conductor 136 is an outermost electrode conductor positioned outermost in the first direction D1 among the plurality of electrode conductors 131 to 136. The electrode conductor 136 is a second outermost electrode conductor positioned closest to the side surface 2*c* among the plurality of electrode conductors 131 to 136. As in the case of the electrode conductor 131, each of the electrode conductors 132 to 136 includes the conductor part C11*a* exposed at least on the main surface 2*a*. The shape and position of the conductor part C11*a* of each of the electrode conductors 132 to 136 are the same as the shape and position of the conductor part C11*a* of the electrode conductor 131. Accordingly, the conductor parts C11*a* of the plurality of electrode conductors 131 to 136 overlap when viewed from the first direction D1. Unlike the electrode conductor 131, each of the electrode conductors 132 to 136 does not include the conductor part C11*b*.

The external electrode 4A includes a plurality of electrode conductors 141, 142, 143, 144, 145, and 146 illustrated in FIG. 8. The external electrode 4A includes the plurality of electrode conductors 141 to 146 stacked in the first direction D1. In this modification example, the number of the plurality of electrode conductors 141 to 146 is "6". The electrode conductor 141, the electrode conductor 142, the electrode conductor 143, the electrode conductor 144, the electrode conductor 145, and the electrode conductor 146 are stacked in this order in the direction from the side surface 2*b* toward the side surface 2*c*. The plurality of electrode conductors 141 to 146 are disposed in the first direction D1 and interconnected. The plurality of electrode conductors 141 to 146 are physically directly interconnected. The electrode conductors 141 to 146 may be integrated to the extent that the boundaries between the electrode conductors 141 to 146 cannot be visually recognized.

The electrode conductor 141 is an outermost electrode conductor positioned outermost in the first direction D1 among the plurality of electrode conductors 141 to 146. The electrode conductor 141 is a first outermost electrode conductor positioned closest to the side surface 2*b* among the plurality of electrode conductors 141 to 146. The electrode conductor 141 includes a conductor part C12*a*. The conductor part C12*a* is a first conductor part exposed at least on the main surface 2*a*. In this modification example, the conductor part C12*a* is exposed on the main surface 2*a* and the end surface 2*e*. The conductor part C12*a* has a substantially L shape when viewed from the first direction D1.

The electrode conductors 142 to 145 are positioned between the electrode conductor 141 and the electrode conductor 146 in the first direction D1. As in the case of the electrode conductor 141, each of the electrode conductors 142 to 145 includes the conductor part C12*a* exposed at least on the main surface 2*a*. The shape and position of the conductor part C12*a* of each of the electrode conductors 142 to 145 are the same as the shape and position of the conductor part C12*a* of the electrode conductor 141.

The electrode conductor 146 is an outermost electrode conductor positioned outermost in the first direction D1 among the plurality of electrode conductors 141 to 146. The electrode conductor 146 is a second outermost electrode conductor positioned closest to the side surface 2*c* among the plurality of electrode conductors 141 to 146. The electrode conductor 146 includes the conductor part C12*a* and a conductor part C12*b*. In this modification example, the shape and position of the conductor part C12*a* of the electrode conductor 146 are the same as the shape and position of the conductor part C12*a* of the electrode conductor 141. Accordingly, the conductor parts C12*a* of the plurality of electrode conductors 141 to 146 overlap when viewed from the first direction D1. The conductor part C12*b* is a second conductor part protruding into the element body 2 when viewed from the first direction D1. The conductor part C12*b* extends in a direction intersecting the second direction D2 and the third direction D3 when viewed from the first direction D1. One of both ends of the conductor part C12*b* is continuous with the conductor part C12*a* of the electrode conductor 146. In the above embodiment, as illustrated in FIG. 4, of both ends of the conductor part C2*b*, the end portion that is not continuous with the conductor part C2*a* is not continuous with the coil conductor 76 positioned in the same layer as the electrode conductor 45. In this modification example, as illustrated in FIG. 8, of both ends of the conductor part C12*b*, the end portion that is not continuous with the conductor part C12*a* is continuous with a coil conductor 177 positioned in the same layer as the electrode conductor 146.

As illustrated in FIG. 7, the coil 7A is disposed in the element body 2 such that the coil axis direction of the coil 7A is along the first direction D1. The coil 7A includes a plurality of coil conductors 171, 172, 173, 174, 175, 176, 177, and 178. The coil 7A includes the plurality of coil conductors 171 to 178 stacked in the first direction D1. In the present embodiment, the number of the plurality of coil conductors 171 to 178 is "8". The number of coil conductors of the coil 7A is greater than the number of electrode conductors of each of the pair of external electrodes 3A and 4A. The coil conductor 171, the coil conductor 172, the coil conductor 173, the coil conductor 174, the coil conductor 175, the coil conductor 176, the coil conductor 177, and the coil conductor 178 are stacked in this order in the direction from the side surface 2*b* toward the side surface 2*c*. The plurality of coil conductors 171 to 178 are disposed in the first direction D1, that is, the coil axis direction of the coil 7A. The plurality of coil conductors 171 to 178 are interconnected. The plurality of coil conductors 171 to 178 are physically directly interconnected. The coil conductors 171 to 178 may be integrated to the extent that the boundaries between the coil conductors 171 to 178 cannot be visually recognized.

As illustrated in FIG. 7, the coil conductor 171 is an outermost coil conductor positioned outermost in the coil axis direction of the coil 7A among the plurality of coil conductors 171 to 178. The coil conductor 171 is positioned at an end of the coil 7A in the coil axis direction of the coil 7A. The coil conductor 171 is positioned closest to the side surface 2*b* among the plurality of coil conductors 171 to 178. The coil conductor 171 is a second coil conductor positioned between the coil conductor 172 and the side surface 2*b*. As illustrated in FIG. 8, the coil conductor 171 is not positioned in the same layer as any of the plurality of electrode conductors 131 to 136 and the plurality of electrode conductors 141 to 146. The electrode conductors 131 and 141 are outermost electrode conductors. The electrode conductors 131 and 141 are not positioned in the same layer as the coil conductor 171. The coil conductor 171 is an outermost coil conductor.

The coil conductor 171 includes conductor parts C13*a* and C13*b*. The conductor part C13*a* of the coil conductor 171 is a third conductor part configuring a part of an annular track in the coil 7A. The conductor part C13*a* of the coil conductor 171 extends to surround the coil axis of the coil 7A. The conductor part C13*b* of the coil conductor 171 is a fourth conductor part protruding outside the annular track of the coil 7A when viewed from the first direction D1. The conductor part C13*b* of the coil conductor 171 is continuous with the conductor part C13*a* of the coil conductor 171. The conductor part C13*b* of the coil conductor 171 is connected to the conductor part C11*b* of the electrode conductor 131 in the first direction D1. The conductor part C13*b* of the coil conductor 171 is physically directly connected to the conductor part C11*b* of the electrode conductor 131. The conductor part C13*b* of the coil conductor 171 may be integrated with the conductor part C11*b* of the electrode conductor 131 to the extent that the boundary therebetween cannot be visually recognized.

The plurality of coil conductors 172 to 177 are first coil conductors positioned in the same layer as the plurality of electrode conductors 131 to 136 and the plurality of electrode conductors 141 to 146. The coil conductor 172 is positioned in the same layer as the electrode conductors 131 and 141. As in the case of the coil conductor 171, the coil conductor 172 includes the conductor part C13*a* and the conductor part C13*b*. The shape and position of the conductor parts C13*a* and C13*b* of the coil conductor 172 are the same as the shape and position of the conductor parts C13*a* and C13*b* of the coil conductor 171. In this modification example, the entire coil conductor 172 overlaps the coil conductor 171 when viewed from the first direction D1. The entire coil conductor 172 is connected to the coil conductor 171 in the first direction D1. The entire coil conductor 172 is physically directly connected to the coil conductor 171. The entire coil conductor 172 may be integrated with the coil conductor 171 to the extent that the boundary therebetween cannot be visually recognized. Of both ends of the conductor part C13*b* of the coil conductor 172, the end portion that is not continuous with the conductor part C13*a* is continuous with the conductor part C11*b* of the electrode conductor 131 positioned in the same layer. The part where the coil conductor 172 and the electrode conductor 131 are continuous overlaps the coil conductor 171 in the first direction D1.

The coil conductor 173 is positioned in the same layer as the electrode conductors 132 and 142. The coil conductor 173 includes the conductor part C13*a* extending to surround the coil axis of the coil 7A. One end of the conductor part C13*a* of the coil conductor 173 is connected to one end of the conductor part C13*a* of the coil conductor 172 in the first direction D1. One end of the conductor part C13*a* of the coil conductor 173 is physically directly connected to one end of the conductor part C13*a* of the coil conductor 172. One end of the conductor part C13*a* of the coil conductor 173 may be integrated with one end of the conductor part C13*a* of the coil conductor 172 to the extent that the boundary therebetween cannot be visually recognized.

The coil conductor 174 is positioned in the same layer as the electrode conductors 133 and 143. The coil conductor 174 includes the conductor part C13*a* extending to surround the coil axis of the coil 7A. The shape and position of the conductor parts C13*a* and C13*b* of the coil conductor 174 are the same as the shape and position of the conductor parts C13*a* and C13*b* of the coil conductor 173. In this modification example, the entire coil conductor 174 overlaps the coil conductor 173 when viewed from the first direction D1. The entire coil conductor 174 is connected to the coil conductor 173 in the first direction D1. The entire coil conductor 174 is physically directly connected to the coil conductor 173. The entire coil conductor 174 may be integrated with the coil conductor 173 to the extent that the boundary therebetween cannot be visually recognized.

The coil conductor 175 is positioned in the same layer as the electrode conductors 134 and 144. The coil conductor 175 includes the conductor part C13*a* extending to surround the coil axis of the coil 7A. One end of the conductor part C13*a* of the coil conductor 175 is connected to one end of the conductor part C13*a* of the coil conductor 174 in the first direction D1. One end of the conductor part C13*a* of the coil conductor 175 is physically directly connected to one end of the conductor part C13*a* of the coil conductor 174. One end of the conductor part C13*a* of the coil conductor 175 may be integrated with one end of the conductor part C13*a* of the coil conductor 174 to the extent that the boundary therebetween cannot be visually recognized.

The coil conductor 176 is positioned in the same layer as the electrode conductors 135 and 145. The coil conductor 176 includes the conductor part C13*a* extending to surround the coil axis of the coil 7A. The shape and position of the conductor parts C13*a* and C13*b* of the coil conductor 176 are the same as the shape and position of the conductor parts C13*a* and C13*b* of the coil conductor 175. In this modification example, the entire coil conductor 176 overlaps the coil conductor 175 when viewed from the first direction D1. The entire coil conductor 176 is connected to the coil conductor 175 in the first direction D1. The entire coil conductor 176 is physically directly connected to the coil conductor 175. The entire coil conductor 176 may be integrated with the coil conductor 175 to the extent that the boundary therebetween cannot be visually recognized.

The coil conductor 177 is positioned in the same layer as the electrode conductors 136 and 146. As in the case of the coil conductor 172, the coil conductor 177 includes the conductor part C13*a* and the conductor part C13*b*. The conductor part C13*a* of the coil conductor 177 configures a part of the annular track in the coil 7A. The conductor part C13*b* protrudes outside the annular track of the coil 7A when viewed from the first direction D1. The shape and position of the conductor parts C13*a* and C13*b* of the coil conductor 177 are the same as the shape and position of the conductor parts C13*a* and C13*b* of the coil conductor 178. Accordingly, the entire coil conductor 177 overlaps the coil conductor 178 when viewed from the first direction D1. The entire coil conductor 177 is connected to the coil conductor 178 in the first direction D1. The entire coil conductor 177 is physically directly connected to the coil conductor 178. The entire coil conductor 177 may be integrated with the coil conductor 178 to the extent that the boundary therebetween cannot be visually recognized. Of both ends of the conductor part C13*b* of the coil conductor 177, the end portion that is not continuous with the conductor part C13*a* is continuous with the conductor part C12*b* of the electrode conductor 146 positioned in the same layer. The part where the coil conductor 177 and the electrode conductor 146 are continuous overlaps the coil conductor 178 in the first direction D1.

As illustrated in FIG. 7, the coil conductor 178 is an outermost coil conductor positioned outermost in the coil axis direction of the coil 7A among the plurality of coil conductors 171 to 178. The coil conductor 178 is positioned at an end of the coil 7A in the coil axis direction of the coil 7A. The coil conductor 178 is positioned closest to the side surface 2*c* among the plurality of coil conductors 171 to 178. The coil conductor 178 is a third coil conductor positioned between the coil conductor 177 and the side surface 2*c*. As illustrated in FIG. 8, the coil conductor 178 is not positioned in the same layer as any of the plurality of electrode conductors 131 to 136 and the plurality of electrode conductors 141 to 146. The electrode conductors 136 and 146 are outermost electrode conductors. The electrode conductors 136 and 146 are not positioned in the same layer as the coil conductor 178. The coil conductor 178 is an outermost coil conductor. As in the case of the coil conductor 177, the coil conductor 178 includes the conductor part C13*a* and the conductor part C13*b*.

The plurality of electrode conductors 131 to 136 and 141 to 146 are positioned in the same layer as the plurality of coil conductors 172 to 177 and are not positioned in the same layer as the coil conductors 171 and 178. In the multilayer coil component 1A, the volume of the external electrodes 3A and 4A with respect to the element body 2 in the first direction D1 is smaller than in a configuration in which a plurality of electrode conductors are also positioned in the same layer as the coil conductors 171 and 178. In the multilayer coil component 1A, the external electrodes 3A and 4A tend not to peel off the element body 2 even in the case of a difference in coefficient of thermal expansion or thermal contraction between the element body 2 and the external electrodes 3A and 4A. As a result, deterioration of the characteristics of the multilayer coil component 1A is suppressed.

The coil conductor 172 positioned in the same layer as the electrode conductor 131 overlaps the coil conductor 171 when viewed from the first direction D1 and is continuous with the electrode conductor 131. The coil conductor 177 positioned in the same layer as the electrode conductor 146 overlaps the coil conductor 178 when viewed from the first direction D1 and is continuous with the electrode conductor 146. The part where the coil conductor 172 and the electrode conductor 131 are continuous overlaps the coil conductor 171 in the first direction D1, and the part where the coil conductor 177 and the electrode conductor 146 are continuous overlaps the coil conductor 178 in the first direction D1. In this case, the direct current resistance of the coil 7A decreases. Consequently, the characteristics of the multilayer coil component 1A are improved.

Second Embodiment

Figure 9:
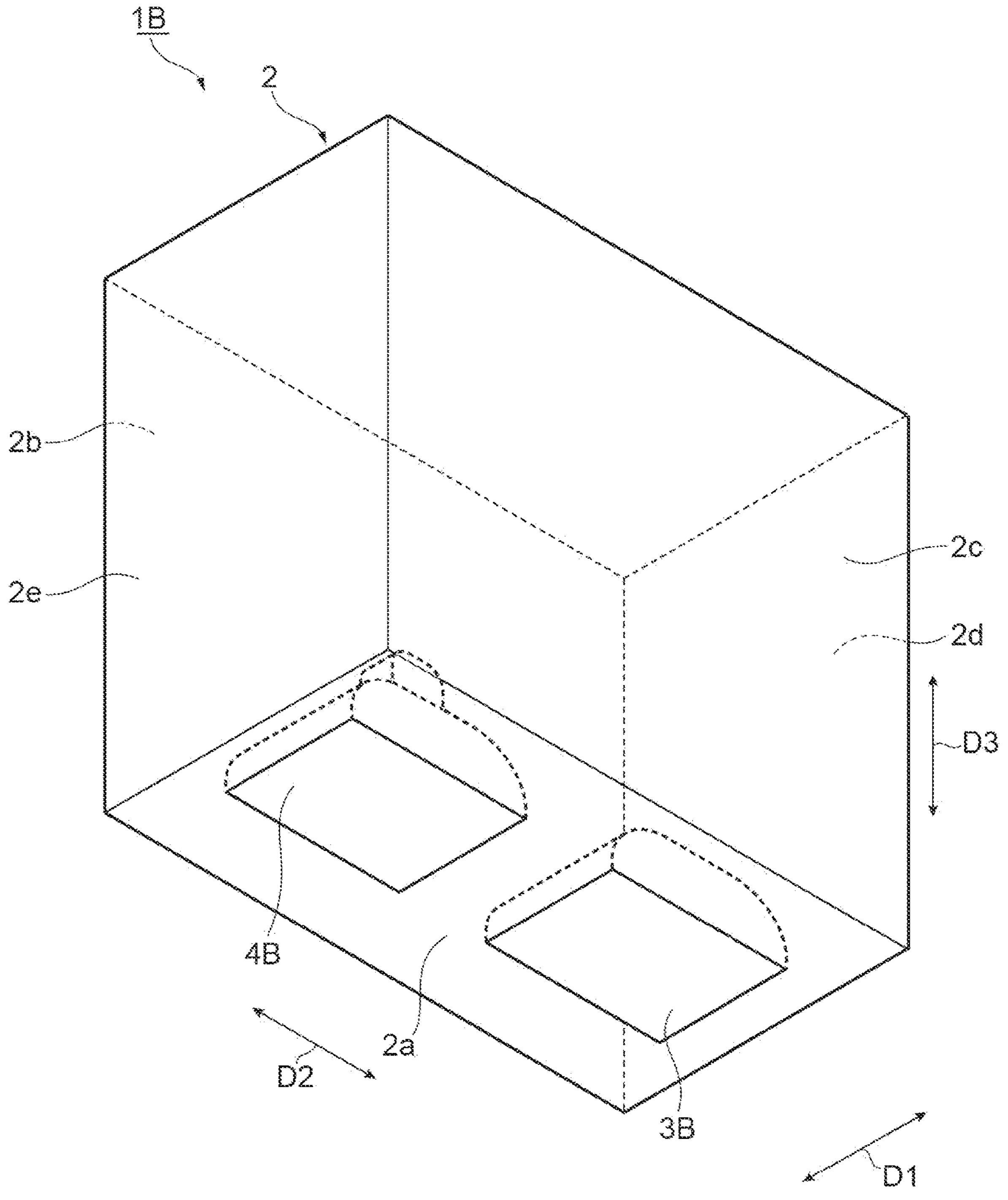
FIG. 9 is a perspective view illustrating a multilayer coil component according to a second embodiment.
Figure 10:
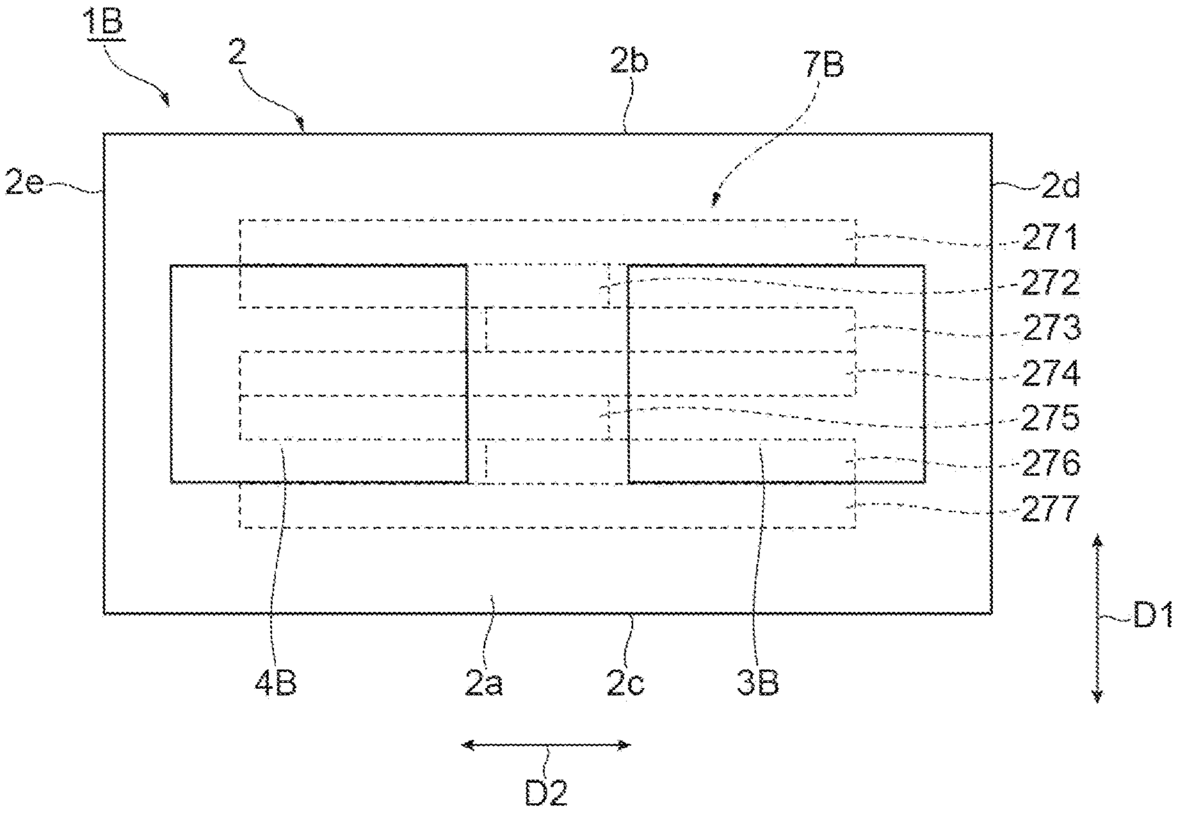
FIG. 10 is a plan view illustrating the multilayer coil component according to the second embodiment.
Figure 11:
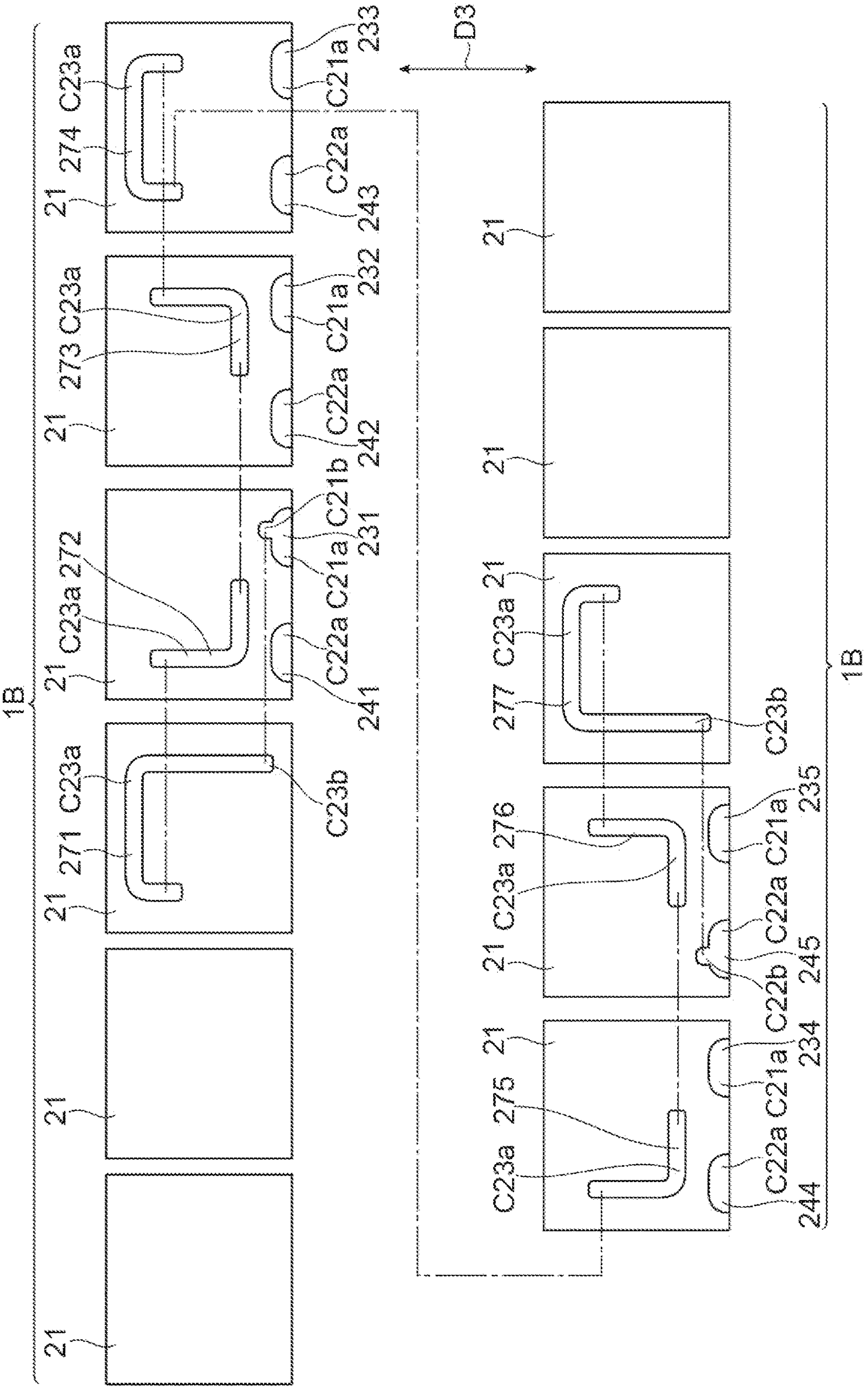
FIG. 11 is an exploded view illustrating the configuration of the multilayer coil component according to the second embodiment.

Next, the configuration of a multilayer coil component 1B according to a second embodiment will be described with reference to FIGS. 9 to 11. FIG. 9 is a perspective view illustrating the multilayer coil component 1B according to the second embodiment. FIG. 10 is a plan view illustrating the multilayer coil component 1B according to the second embodiment. FIG. 11 is an exploded view illustrating the configuration of the multilayer coil component 1B according to the second embodiment. The second embodiment differs from the above first embodiment in terms of electrode conductor and coil conductor configurations. The differences between the above first embodiment and the second embodiment will be mainly described below.

The multilayer coil component 1B includes the element body 2, a pair of external electrodes 3B and 4B, and a coil 7B. Unlike the external electrode 3, the external electrode 3B is exposed only on the main surface 2*a*. Unlike the external electrode 4, the external electrode 4B is exposed only on the main surface 2*a*. Each of the external electrodes 3B and 4B extends along the first direction D1 and the second direction D2. Each of the external electrodes 3B and 4B has a rectangular shape when viewed from the third direction D3. Each of the external electrodes 3B and 4B has a thickness in the third direction D3.

The external electrode 3B includes a plurality of electrode conductors 231, 232, 233, 234, and 235 illustrated in FIG. 11. The external electrode 3B includes the plurality of electrode conductors 231 to 235 stacked in the first direction D1. The electrode conductor 231, the electrode conductor 232, the electrode conductor 233, the electrode conductor 234, and the electrode conductor 235 are stacked in this order in the direction from the side surface 2*b* toward the side surface 2*c*. The plurality of electrode conductors 231 to 235 are disposed in the first direction D1 and interconnected. The plurality of electrode conductors 231 to 235 are physically directly interconnected. The electrode conductors 231 to 235 may be integrated to the extent that the boundaries between the electrode conductors 231 to 235 cannot be visually recognized.

The electrode conductor 231 is an outermost electrode conductor positioned outermost in the first direction D1 among the plurality of electrode conductors 231 to 235. The electrode conductor 231 is a first outermost electrode conductor positioned closest to the side surface 2*b* among the plurality of electrode conductors 231 to 235. The electrode conductor 231 includes conductor parts C21*a* and C21*b*. The conductor part C21*a* is a first conductor part exposed at least on the main surface 2*a*. In the present embodiment, the conductor part C21*a* is exposed only on the main surface 2*a*. The conductor part C21*b* is a second conductor part protruding into the element body 2 when viewed from the first direction D1. Unlike the conductor part C1*b*, the conductor part C21*b* extends along the third direction D3 when viewed from the first direction D1. The conductor part C21*b* is continuous with the conductor part C21*a* of the electrode conductor 231.

The electrode conductors 232 to 234 are positioned between the electrode conductor 231 and the electrode conductor 235 in the first direction D1. The electrode conductor 235 is an outermost electrode conductor positioned outermost in the first direction D1 among the plurality of electrode conductors 231 to 235. The electrode conductor 235 is a second outermost electrode conductor positioned closest to the side surface 2*c* among the plurality of electrode conductors 231 to 235. As in the case of the electrode conductor 231, each of the electrode conductors 232 to 235 includes the conductor part C21*a*. In the present embodiment, the shape and position of the conductor part C21 a of each of the electrode conductors 232 to 235 are the same as the shape and position of the conductor part C21*a* of the electrode conductor 231. Unlike the electrode conductor 231, each of the electrode conductors 232 to 235 does not include the conductor part C21*b*.

The external electrode 4B includes a plurality of electrode conductors 241, 242, 243, 244, and 245 illustrated in FIG. 11. The external electrode 4B includes the plurality of electrode conductors 241 to 245 stacked in the first direction D1. The electrode conductor 241, the electrode conductor 242, the electrode conductor 243, the electrode conductor 244, and the electrode conductor 245 are stacked in this order in the direction from the side surface 2*b* toward the side surface 2*c*. The plurality of electrode conductors 241 to 245 are disposed in the first direction D1 and interconnected. The plurality of electrode conductors 241 to 245 are physically directly interconnected. The electrode conductors 241 to 245 may be integrated to the extent that the boundaries between the electrode conductors 241 to 245 cannot be visually recognized.

The electrode conductor 241 is an outermost electrode conductor positioned outermost in the first direction D1 among the plurality of electrode conductors 241 to 245. The electrode conductor 241 is a first outermost electrode conductor positioned closest to the side surface 2*b* among the plurality of electrode conductors 241 to 245. The electrode conductor 241 includes a conductor part C22*a*. The conductor part C22*a* is a first conductor part exposed at least on the main surface 2*a*. In the present embodiment, the conductor part C22*a* is exposed only on the main surface 2*a*.

The electrode conductors 242 to 244 are positioned between the electrode conductor 241 and the electrode conductor 245 in the first direction D1. As in the case of the electrode conductor 241, each of the electrode conductors 242 to 244 includes the conductor part C22*a*. In the present embodiment, the shape and position of the conductor part C22*a* of each of the electrode conductors 242 to 244 are the same as the shape and position of the conductor part C22*a* of the electrode conductor 241.

The electrode conductor 245 is an outermost electrode conductor positioned outermost in the first direction D1 among the plurality of electrode conductors 241 to 245. The electrode conductor 245 is a second outermost electrode conductor positioned closest to the side surface 2*c* among the plurality of electrode conductors 241 to 245. The electrode conductor 245 includes the conductor part C22*a* and a conductor part C22*b*. In the present embodiment, the shape and position of the conductor part C22*a* of the electrode conductor 245 are the same as the shape and position of the conductor part C22*a* of the electrode conductor 241. The conductor part C22*b* is a second conductor part protruding into the element body 2 when viewed from the first direction D1. Unlike the conductor part C2*b*, the conductor part C22*b* extends along the third direction D3 when viewed from the first direction D1. The conductor part C22*b* is continuous with the conductor part C22*a* of the electrode conductor 245.

As illustrated in FIG. 10, the coil 7B is disposed in the element body 2 such that the coil axis direction of the coil 7B is along the first direction D1. The coil 7B includes a plurality of coil conductors 271, 272, 273, 274, 275, 276, and 277. The coil 7B includes the plurality of coil conductors 271 to 277 stacked in the first direction D1. The coil conductor 271, the coil conductor 272, the coil conductor 273, the coil conductor 274, the coil conductor 275, the coil conductor 276, and the coil conductor 277 are stacked in this order in the direction from the side surface 2*b* toward the side surface 2*c*. The plurality of coil conductors 271 to 277 are disposed in the first direction D1, that is, the coil axis direction of the coil 7B. The plurality of coil conductors 271 to 277 are interconnected. The plurality of coil conductors 271 to 277 are physically directly interconnected. The coil conductors 271 to 277 may be integrated to the extent that the boundaries between the coil conductors 271 to 277 cannot be visually recognized.

As illustrated in FIG. 10, the coil conductor 271 is an outermost coil conductor positioned outermost in the coil axis direction of the coil 7B among the plurality of coil conductors 271 to 277. The coil conductor 271 is positioned closest to the side surface 2*b* among the plurality of coil conductors 271 to 277. The coil conductor 271 is a second coil conductor positioned between the coil conductor 272 and the side surface 2*b*. As illustrated in FIG. 11, the coil conductor 271 is not positioned in the same layer as any of the plurality of electrode conductors 231 to 235 and the plurality of electrode conductors 241 to 245.

The coil conductor 271 includes conductor parts C23*a* and C23*b*. The conductor part C23*a* of the coil conductor 271 is a third conductor part configuring a part of an annular track in the coil 7B. The conductor part C23*a* of the coil conductor 271 extends to surround the coil axis of the coil 7B. One end of the conductor part C23*a* of the coil conductor 271 is connected to one end of the conductor part C23*a* of the coil conductor 272 in the first direction D1. One end of the conductor part C23*a* of the coil conductor 271 is physically directly connected to one end of the conductor part C23*a* of the coil conductor 272. One end of the conductor part C23*a* of the coil conductor 271 may be integrated with one end of the conductor part C23*a* of the coil conductor 272 to the extent that the boundary therebetween cannot be visually recognized. The conductor part C23*b* of the coil conductor 271 is a fourth conductor part protruding outside the annular track of the coil 7B when viewed from the first direction D1. Unlike the conductor part C3*b* of the coil conductor 71 according to the first embodiment, the conductor part C23*b* of the coil conductor 271 extends along the third direction D3 when viewed from the first direction D1. The conductor part C23*b* of the coil conductor 271 is continuous with the conductor part C23*a* of the coil conductor 271. In the present embodiment, one end of the conductor part C23*b* of the coil conductor 271 is continuous with the other end of the conductor part C23*a* of the coil conductor 271. The other end of the conductor part C23*b* of the coil conductor 271 is connected to the conductor part C21*b* of the electrode conductor 231 in the first direction D1. The other end of the conductor part C23*b* of the coil conductor 271 is physically directly connected to the conductor part C21*b* of the electrode conductor 231. The other end of the conductor part C23*b* of the coil conductor 271 may be integrated with the conductor part C21*b* of the electrode conductor 231 to the extent that the boundary therebetween cannot be visually recognized.

The plurality of coil conductors 272 to 276 are first coil conductors positioned in the same layer as the plurality of electrode conductors 231 to 235 and the plurality of electrode conductors 241 to 245. As in the case of the coil conductor 271, each of the coil conductors 272 to 276 includes the conductor part C23*a* configuring a part of the annular track in the coil 7B. The coil conductor 272 is positioned in the same layer as the electrode conductors 231 and 241. The other end of the conductor part C23*a* of the coil conductor 272 is connected to one end of the conductor part C23*a* of the coil conductor 273 in the first direction D1. The other end of the conductor part C23*a* of the coil conductor 272 is physically directly connected to one end of the conductor part C23*a* of the coil conductor 273. The other end of the conductor part C23*a* of the coil conductor 272 may be integrated with one end of the conductor part C23*a* of the coil conductor 273 to the extent that the boundary therebetween cannot be visually recognized.

The coil conductor 273 is positioned in the same layer as the electrode conductors 232 and 242. The other end of the conductor part C23*a* of the coil conductor 273 is connected to one end of the conductor part C23*a* of the coil conductor 274 in the first direction D1. The other end of the conductor part C23*a* of the coil conductor 273 is physically directly connected to one end of the conductor part C23*a* of the coil conductor 274. The other end of the conductor part C23*a* of the coil conductor 273 may be integrated with one end of the conductor part C23*a* of the coil conductor 274 to the extent that the boundary therebetween cannot be visually recognized. The coil conductor 274 is positioned in the same layer as the electrode conductors 233 and 243. The other end of the conductor part C23*a* of the coil conductor 274 is connected to one end of the conductor part C23*a* of the coil conductor 275 in the first direction D1. The other end of the conductor part C23*a* of the coil conductor 274 is physically directly connected to one end of the conductor part C23*a* of the coil conductor 275. The other end of the conductor part C23*a* of the coil conductor 274 may be integrated with one end of the conductor part C23*a* of the coil conductor 275 to the extent that the boundary therebetween cannot be visually recognized.

The coil conductor 275 is positioned in the same layer as the electrode conductors 234 and 244. The other end of the conductor part C23*a* of the coil conductor 275 is connected to one end of the conductor part C23*a* of the coil conductor 276 in the first direction D1. The other end of the conductor part C23*a* of the coil conductor 275 is physically directly connected to one end of the conductor part C23*a* of the coil conductor 276. The other end of the conductor part C23*a* of the coil conductor 275 may be integrated with one end of the conductor part C23*a* of the coil conductor 276 to the extent that the boundary therebetween cannot be visually recognized. The coil conductor 276 is positioned in the same layer as the electrode conductors 235 and 245. The other end of the conductor part C23*a* of the coil conductor 276 is connected to one end of the conductor part C23*a* of the coil conductor 277 in the first direction D1. The other end of the conductor part C23*a* of the coil conductor 276 is physically directly connected to one end of the conductor part C23*a* of the coil conductor 277. The other end of the conductor part C23*a* of the coil conductor 276 may be integrated with one end of the conductor part C23*a* of the coil conductor 277 to the extent that the boundary therebetween cannot be visually recognized.

As illustrated in FIG. 10, the coil conductor 277 is an outermost coil conductor positioned outermost in the coil axis direction of the coil 7B among the plurality of coil conductors 271 to 277. The coil conductor 277 is positioned closest to the side surface 2*c* among the plurality of coil conductors 271 to 277. The coil conductor 277 is a third coil conductor positioned between the coil conductor 276 and the side surface 2*c*. As illustrated in FIG. 11, the coil conductor 277 is not positioned in the same layer as any of the plurality of electrode conductors 231 to 235 and the plurality of electrode conductors 241 to 245.

As in the case of the coil conductor 271, the coil conductor 277 includes the conductor parts C23*a* and C23*b*. The conductor part C23*a* of the coil conductor 277 is a third conductor part configuring a part of the annular track in the coil 7B. Unlike the conductor part C3*b* of the coil conductor 77 according to the first embodiment, the conductor part C23*b* of the coil conductor 277 extends along the third direction D3 when viewed from the first direction D1. The conductor part C23*b* of the coil conductor 277 is continuous with the conductor part C23*a* of the coil conductor 277. In the present embodiment, one end of the conductor part C23*b* of the coil conductor 277 is continuous with the other end of the conductor part C23*a* of the coil conductor 277. The other end of the conductor part C23*b* of the coil conductor 277 is connected to the conductor part C22*b* of the electrode conductor 245 in the first direction D1. The other end of the conductor part C23*b* of the coil conductor 277 is physically directly connected to the conductor part C22*b* of the electrode conductor 245. The other end of the conductor part C23*b* of the coil conductor 277 may be integrated with the conductor part C22*b* of the electrode conductor 245 to the extent that the boundary therebetween cannot be visually recognized.

The plurality of electrode conductors 231 to 235 and 241 to 245 are positioned in the same layer as the plurality of coil conductors 272 to 276 and are not positioned in the same layer as the coil conductors 271 and 277. In the multilayer coil component 1B, the volume of the external electrodes 3B and 4B with respect to the element body 2 in the first direction D1 is smaller than in a configuration in which a plurality of electrode conductors are also positioned in the same layer as the coil conductors 271 and 277. In the multilayer coil component 1B, the external electrodes 3B and 4B tend not to peel off the element body 2 even in the case of a difference in coefficient of thermal expansion or thermal contraction between the element body 2 and the external electrodes 3B and 4B. As a result, deterioration of the characteristics of the multilayer coil component 1B is suppressed.

The external electrodes 3B and 4B are exposed only on the main surface 2*a*. Accordingly, the volume of the external electrodes 3B and 4B with respect to the element body 2 is small. Accordingly, the external electrodes 3B and 4B tend not to peel off the element body 2 even in the case of a difference in coefficient of thermal expansion or thermal contraction between the element body 2 and the external electrodes 3B and 4B. As a result, deterioration of the characteristics of the multilayer coil component 1B is further suppressed.

Although the embodiment and modifications of the present invention have been described above, the present invention is not necessarily limited to the embodiment and modifications, and the embodiment can be variously changed without departing from the scope of the invention.

For example, the width of the conductor part C1*b* of the electrode conductor 31 may be different from the width of the conductor part C3*b* of the coil conductor 71. Likewise, the width of the conductor part C2*b* of the electrode conductor 45 may be different from the width of the conductor part C3*b* of the coil conductor 77. The conductor parts C3*a* of the plurality of coil conductors 71 to 77 may have different widths.

For example, each of the number of the plurality of electrode conductors 31 to 35 of the external electrode 3 and the number of the plurality of electrode conductors 41 to 45 of the external electrode 4 may be less than the number of the coil conductors 71 to 77 of the coil 7 by three or more.

What is claimed is:

1. A multilayer coil component comprising:

an element body including a main surface configuring a mounting surface, a first side surface and a second side surface opposing each other in a first direction, and a pair of end surfaces opposing each other in a second direction;

a coil disposed in the element body; and an external electrode electrically connected to the coil and disposed in the element body, wherein the coil includes a plurality of coil conductors disposed in the first direction and interconnected, the external electrode includes a plurality of electrode conductors disposed in the first direction and interconnected, and the plurality of coil conductors include:

a plurality of first coil conductors positioned in the same layer as the plurality of electrode conductors;

a second coil conductor not positioned in the same layer as any of the plurality of electrode conductors and electrically connected to a first outermost electrode conductor positioned closest to the first side surface among the plurality of electrode conductors; and a third coil conductor not positioned in the same layer as any of the plurality of electrode conductors and electrically connected to a second outermost electrode conductor positioned closest to the second side surface among the plurality of electrode conductors.

2. The multilayer coil component according to claim 1, wherein the external electrode includes a first external electrode including the first outermost electrode conductor and a second external electrode including the second outermost electrode conductor, each of the first outermost electrode conductor and the second outermost electrode conductor includes a first conductor part and a second conductor part, the first conductor part is exposed at least on the main surface, the second conductor part is continuous with the first conductor part and protrudes into the element body when viewed from the first direction, the second coil conductor overlaps the second conductor part of the first outermost electrode conductor when viewed from the first direction and is electrically connected to the second conductor part of the first outermost electrode conductor, and the third coil conductor overlaps the second conductor part of the second outermost electrode conductor when viewed from the first direction and is electrically connected to the second conductor part of the second outermost electrode conductor.

3. The multilayer coil component according to claim 2, wherein each of the second coil conductor and the third coil conductor includes a third conductor part and a fourth conductor part, the third conductor part configures a part of an annular track in the coil, the fourth conductor part is continuous with the third conductor part and protrudes outside the annular track when viewed from the first direction, the fourth conductor part of the second coil conductor overlaps the second conductor part of the first outermost electrode conductor when viewed from the first direction and is electrically connected to the second conductor part of the first outermost electrode conductor, and the fourth conductor part of the third coil conductor overlaps the second conductor part of the second outermost electrode conductor when viewed from the first direction and is electrically connected to the second conductor part of the second outermost electrode conductor.

4. The multilayer coil component according to claim 3, wherein the second conductor part of the first outermost electrode conductor and the fourth conductor part of the second coil conductor are connected to each other in the first direction, and the second conductor part of the second outermost electrode conductor and the fourth conductor part of the third coil conductor are connected to each other in the first direction.

5. The multilayer coil component according to claim 1, wherein the external electrode includes a first external electrode including the first outermost electrode conductor and a second external electrode including the second outermost electrode conductor, the first coil conductor positioned in the same layer as the first outermost electrode conductor overlaps the second coil conductor when viewed from the first direction and is continuous with the first outermost electrode conductor, and the first coil conductor positioned in the same layer as the second outermost electrode conductor overlaps the third coil conductor when viewed from the first direction and is continuous with the second outermost electrode conductor.

6. The multilayer coil component according to claim 1, wherein the external electrode is exposed only on the corresponding end surface of the pair of end surfaces and the main surface.

7. The multilayer coil component according to claim 1, wherein the external electrode is exposed only on the main surface.

8. A multilayer coil component comprising:

an element body including a main surface configuring a mounting surface, a pair of side surfaces opposing each other in a first direction, and a pair of end surfaces opposing each other in a second direction, wherein the first direction extends from a first side surface to a second side surface of the pair of side surfaces;

a coil disposed in the element body such that a coil axis direction is along the first direction and parallel to the main surface that connects the first side surface to the second side surface; and an external electrode electrically connected to the coil and disposed in the element body, wherein a length of the external electrode in the first direction is smaller than a length of the coil in the first direction.

9. The multilayer coil component according to claim 8, wherein the external electrode is exposed only on the corresponding end surface of the pair of end surfaces and the main surface.

10. The multilayer coil component according to claim 8, wherein the external electrode is exposed only on the main surface.

11. A multilayer coil component comprising:

an element body including a main surface configuring a mounting surface, a pair of side surfaces opposing each other in a first direction, and a pair of end surfaces opposing each other in a second direction, wherein the first direction extends from a first side surface to a second side surface of the pair of side surfaces;

a coil disposed in the element body such that a coil axis direction is along the first direction and parallel to the main surface that connects the first side surface to the second side surface; and an external electrode electrically connected to the coil and disposed in the element body, wherein both ends of the coil in the first direction are exposed from the external electrode in the first direction when the external electrode and the coil are viewed from a direction orthogonal to the first direction.

12. The multilayer coil component according to claim 11, wherein the external electrode is exposed only on the corresponding end surface of the pair of end surfaces and the main surface.

13. The multilayer coil component according to claim 11, wherein the external electrode is exposed only on the main surface.

14. A multilayer coil component comprising:

an element body including a main surface configuring a mounting surface, a pair of side surfaces opposing each other in a first direction, and a pair of end surfaces opposing each other in a second direction, wherein the first direction extends from a first side surface to a second side surface of the pair of side surfaces;

a coil disposed in the element body; and an external electrode electrically connected to the coil and disposed in the element body, wherein the coil includes a plurality of coil conductors disposed in a coil axis direction of the coil and interconnected, the coil axis direction is along the first direction and parallel to the main surface that connects the first side surface to the second side surface, the plurality of coil conductors include a pair of outermost coil conductors positioned outermost in the coil axis direction, the external electrode includes a plurality of electrode conductors disposed in the coil axis direction and interconnected, the plurality of electrode conductors include a pair of outermost electrode conductors positioned outermost in the coil axis direction, and each of the pair of outermost electrode conductors is not positioned in the same layer as the pair of outermost coil conductors and is electrically connected to the coil.

15. The multilayer coil component according to claim 1, wherein the coil conductors are disposed in different layers that are (i) parallel to the main surface and (ii) arranged one after another along the first direction, the electrode conductors are disposed in different layers that are (a) parallel to the main surface and (b) arranged one after another along the first direction, each of the plurality of first coil conductors is positioned in the same layer as a corresponding one of the plurality of electrode conductors, the second coil conductor is not positioned in the same layer as the first outermost electrode conductor, and the third coil conductor is not positioned in the same layer as the second outermost electrode conductor.

16. The multilayer coil component according to claim 14, wherein the coil conductors are disposed in different layers that are (i) parallel to each other and (ii) arranged one after another along the coil axis direction, and the electrode conductors are disposed in different layers that are (a) parallel to the layers in which the coil conductors are disposed and (b) arranged one after another along the coil axis direction.

* * * * *